(12) United States Patent
Lin et al.

(10) Patent No.: US 8,054,560 B2
(45) Date of Patent: Nov. 8, 2011

(54) ZOOM LENS

(75) Inventors: Shi Mu Lin, Taipei (TW); Lu-Hua Chen, Qionglin Township, Hsinchu County (TW); Sheng Fang Cheng, Zhubei (TW)

(73) Assignee: A-Optronics Technology Inc., Hsinchu (TW)

( * ) Notice: Subject to any disclaimer, the term of this patent is extended or adjusted under 35 U.S.C. 154(b) by 0 days.

(21) Appl. No.: 12/750,268

(22) Filed: Mar. 30, 2010

(65) Prior Publication Data

US 2011/0242677 A1 Oct. 6, 2011

(51) Int. Cl.
*G02B 15/14* (2006.01)

(52) U.S. Cl. ............... 359/687; 359/686; 348/240.99

(58) Field of Classification Search ......... 359/676, 359/686, 687; 396/72–88; 348/240.99–240.3, 348/335–369

See application file for complete search history.

(56) References Cited

U.S. PATENT DOCUMENTS

| | | | |
|---|---|---|---|
| 5,285,316 A | 2/1994 | Miyano | |
| 5,909,318 A | 6/1999 | Tanaka | |
| 6,714,335 B2 | 3/2004 | Athenstaedt | |
| 6,754,009 B2 * | 6/2004 | Horiuchi | 359/687 |
| 7,379,249 B2 | 5/2008 | Ohashi | |
| 7,453,647 B2 | 11/2008 | Take | |
| 2005/0099700 A1 | 5/2005 | Ohtake | |

* cited by examiner

*Primary Examiner* — Darryl J Collins
(74) *Attorney, Agent, or Firm* — Kile Goekjian Reed & McManus PLLC

(57) ABSTRACT

A zoom lens includes a first, a second, a third and a fourth lens groups that are arranged along an optical axis and from an object side to an image side in sequence. The refractive powers of the four lens groups are positive, negative, positive and positive, respectively. The first and the third lens groups are fixed at a fixed position. The second lens group is movable along the optical axis in accordance with the change of magnification. The fourth lens group is movable along the optical axis in accordance with keeping an image plane fixed at an image sensor. The present invention has at least four pieces of lens that are made of plastic material in order to decrease camera lens weight and move easily the lens groups. In addition, the present invention has small variation of aperture value, moderate zoom ratio and compact size at the same time.

6 Claims, 20 Drawing Sheets

ZOOM LENS

BACKGROUND OF THE INVENTION

1. Field of the Invention

The present invention relates to a zoom lens, in particular, to a zoom lens applied to an image-capturing device such as DV (digital video), DSC (digital still camera) etc.

2. Description of Related Art

Referring to US Patent Publication No. US 2005/0099700A1, it discloses a compact zoom lens. The refractive powers of the four lens groups are positive, negative, positive and positive, respectively. When the zoom lens is zoomed from wide-configuration to tele-configuration, the positions of the first lens group and the third lens group are fixed and the second lens group is moved to image side. The size of the zoom lens is compact, but the zoom ratio (3×) is low.

Referring to U.S. Pat. No. 5,909,318, it discloses a lens image system that includes a first lens group, a second lens group and a third lens group. The first and the second lens groups are movable, and the third lens group can be moved a little (almost fixed). The first lens group is composed of four pieces of lens', the second lens group is also composed of four pieces of lens, and the third lens group includes a color filer and an image lens. However, the number of the lens is too many (11 pieces of lens), so that the size is large and the cost is high.

Referring to U.S. Pat. No. 5,285,316, it discloses four lens groups, and the refractive powers of the four lens groups are positive, negative, positive and positive, respectively. The four lens groups are composed of ten pieces of lens, the third lens group is fixed, two aspherical surfaces are provided. However, the second and/or fourth lens groups are movable, so that the variation of the focal length is insufficient. Hence, when pixel and brightness are increased, the whole size of the zoom lens is increased and the image multiple and resolution are limited. In addition, the zoom lens needs many numbers of lenses, so that the cost is increased.

Referring to U.S. Pat. No. 6,714,355, it provides 3× zoom ratio and 2.8 Fno, and it discloses four lens groups, and the refractive powers of the four lens groups are positive, negative, positive and positive, respectively. The four lens groups are composed of ten pieces of lens, the third lens group is movable, and one aspherical surface is provided. However, the zoom ratio is insufficient, the aperture value is too high and the number of lens is too many, so that the zoom lens cannot be compacted.

Referring to U.S. Pat. No. 7,379,249, it provides five lens groups composed of ten pieces of lens that are made of glass, so that the cost is increased. In addition, it provides 2.78~4.02 Fno, so that the variation of aperture value is large. The aperture ratio of wide-configuration to tele-configuration is $(4.02/2.78)^2=2.09$, so that the aperture value at tele-configuration (*4.02) is smaller than the aperture value at wide-configuration (*2.78). In other words, bigger $F_{NO}$ variation range 2.78~4.02 in design, so the input light different is bigger also, the ratio is 2.09 times.

Referring to U.S. Pat. No. 7,453,647, it provides four lens groups composed of nine pieces of lens that are made of glass, three of the lens groups are movable and the total length of the zoom lens is 78.5 mm, so that the cost is increased. In addition, it provides 2.53~4.74 Fno, so that the variation of aperture value is large. The aperture ratio of wide-configuration to tele-configuration is $(4.74/2.53)^2=3.48$, so that the aperture value at tele-configuration (*4.74) is smaller than the aperture value at wide-configuration (*2.53). In other words, bigger $F_{NO}$ variation range 2.53~4.74 in design, so the input light different is bigger also, the ratio is 3.48 times.

SUMMARY OF THE INVENTION

In view of the aforementioned issues, the present invention provides a zoom lens that has small variation of aperture value and moderate zoom ratio, and has the advantage of compact size at the same time.

To achieve the above-mentioned objectives, the present invention provides a zoom lens, including: a first lens group, a second lens group, a third lens group and a fourth lens group. The first lens group with positive refractive power is fixed at a predetermined position. The second lens group with negative refractive power is movable along an optical axis of the zoom lens in accordance with the change of the magnification of the zoom lens. The third lens group with positive refractive power has at least one lens that is fixed at a predetermined position. The fourth lens group with positive refractive power is movable along the optical axis in order to keep an image plane generated by the zoom lens to be projected accurately onto an image sensor. In addition, the first, the second, the third and the fourth lens groups are arranged along the optical axis and from an object side of the zoom lens to an image side of the zoom lens in sequence, and the first, the second, the third and the fourth lens groups conform to the following conditions:

$$4.4<F1/|F2|<4.7; \qquad \text{condition (1)}$$

$$1.2<F1/F3<1.4; \text{ and} \qquad \text{condition (2)}$$

$$1.1<F4/(F_W F_T)^{1/2}<1.4; \qquad \text{condition (3)}$$

wherein F1 is the focal length of the first lens group, F2 is the focal length of the second lens group, F3 is the focal length of the third lens group, F4 is the focal length of the fourth lens group, $F_W$ is the focal length at wide-configuration, and $F_T$ is the focal length at tele-configuration.

To achieve the above-mentioned objectives, the present invention provides a zoom lens, including: a first lens group, a second lens group, a third lens group and a fourth lens group. The first lens group with positive refractive power is fixed at a predetermined position. The second lens group with negative refractive power is movable along an optical axis of the zoom lens in accordance with the change of the magnification of the zoom lens. The third lens group with positive refractive power has at least one lens that is fixed at a predetermined position. The fourth lens group with positive refractive power is movable along the optical axis in order to keep an image plane generated by the zoom lens to be projected accurately onto an image sensor. In addition, the first, the second, the third and the fourth lens groups are arranged along the optical axis and from an object side of the zoom lens to an image side of the zoom lens in sequence, the first lens group has a first lens, a second lens and a third lens that are arranged along the optical axis in sequence, the second lens group has a fourth lens, a fifth lens and a sixth lens that are arranged along the optical axis in sequence, and the first and the second lens groups conform to the following conditions:

$$1.9<fl_{12}/fl_3<2.2; \text{ and} \qquad \text{condition (1)}$$

$$3<fl_{56}/fl_4<4; \qquad \text{condition (2)}$$

wherein $fl_{12}$ is the focal length of the combination of the first lens and the second lens in the first lens group, $fl_3$ is the focal length of the third lens in the first lens group, $fl_4$ is the focal length of the fourth lens in the second lens group, and $fl_{56}$ is the focal length of the combination of the fifth lens and the sixth lens in the second lens group.

To achieve the above-mentioned objectives, the present invention provides a zoom lens, including: a first lens group, a second lens group, a third lens group and a fourth lens group. The first lens group with positive refractive power is fixed at a predetermined position. The second lens group with negative refractive power is movable along an optical axis of the zoom lens in accordance with the change of the magnification of the zoom lens. The third lens group with positive refractive power has at least one lens that is fixed at a predetermined position. The fourth lens group with positive refractive power is movable along the optical axis in order to keep an image plane generated by the zoom lens to be projected accurately onto an image sensor. In addition, the first, the second, the third and the fourth lens groups are arranged along the optical axis and from an object side of the zoom lens to an image side of the zoom lens in sequence, and the fourth lens group conforms to the following conditions:

$$2.2 < F_4/F_W < 2.7; \text{ and} \quad \text{condition (1)}$$

$$0.5 < F_4/F_T < 0.7; \quad \text{condition (2)}$$

wherein F4 is the focal length of the fourth lens group, $F_W$ is the focal length at wide-configuration, and $F_T$ is the focal length at tele-configuration.

To achieve the above-mentioned objectives, the present invention provides a zoom lens, including: a first lens group, a second lens group, a third lens group, a fourth lens group and an aperture. The first lens group with positive refractive power is fixed at a predetermined position. The second lens group with negative refractive power is movable along an optical axis of the zoom lens in accordance with the change of the magnification of the zoom lens. The third lens group with positive refractive power has at least one lens that is fixed at a predetermined position. The fourth lens group with positive refractive power is movable along the optical axis in order to keep an image plane generated by the zoom lens to be projected accurately onto an image sensor. The diameter of the aperture is changeable, and the aperture is arranged along the optical axis and between the second lens group and the third lens group. In addition, the first, the second, the third and the fourth lens groups are arranged along the optical axis and from an object side of the zoom lens to an image side of the zoom lens in sequence, and the first, the second, the third and the fourth lens groups are assembled in the image-capturing device.

Hence, the present invention has the following advantages:

1. The present invention has small variation of aperture value (the ratio of wide-configuration to tele-configuration is $(3.39/2.84)^2=1.42$) and moderate zoom ratio (5× zoom ratio), and has the advantage of compact size at the same time in order to decrease the whole volume of image capturing device.

2. The aperture value of the zoom lens of the present invention is adjustable according to different image-capturing applications. For example, when using large aperture value to capture dynamic image, Fno needs to be small; when using high resolution to capture static image, Fno needs to be large.

3. The present invention has at least four pieces of lens that are made of plastic material in order to achieve the purposes of decreasing camera lens weight and moving easily the lens groups.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are provided solely for reference and illustration, without any intention that they be used for limiting the present invention.

DETAILED DESCRIPTION OF THE PREFERRED EMBODIMENTS

Figure 1A:
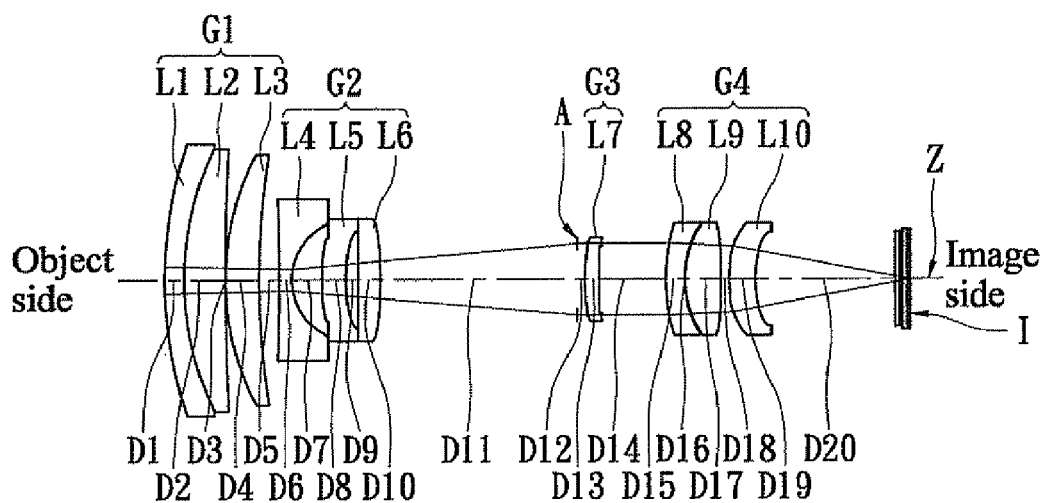
FIGS. 1A-1C are schematic views of the lens groups arranged at wide-configuration, normal-configuration and tele-configuration according to the first embodiment of the present invention, respectively.
Figure 1B:
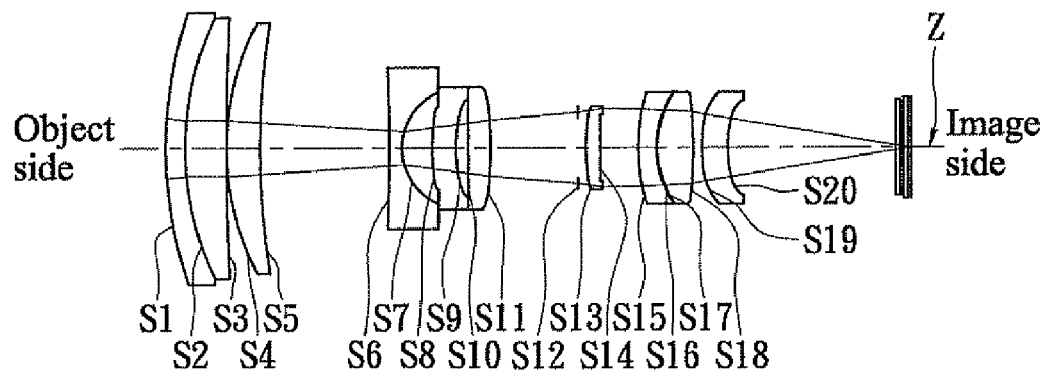
Figure 1C:
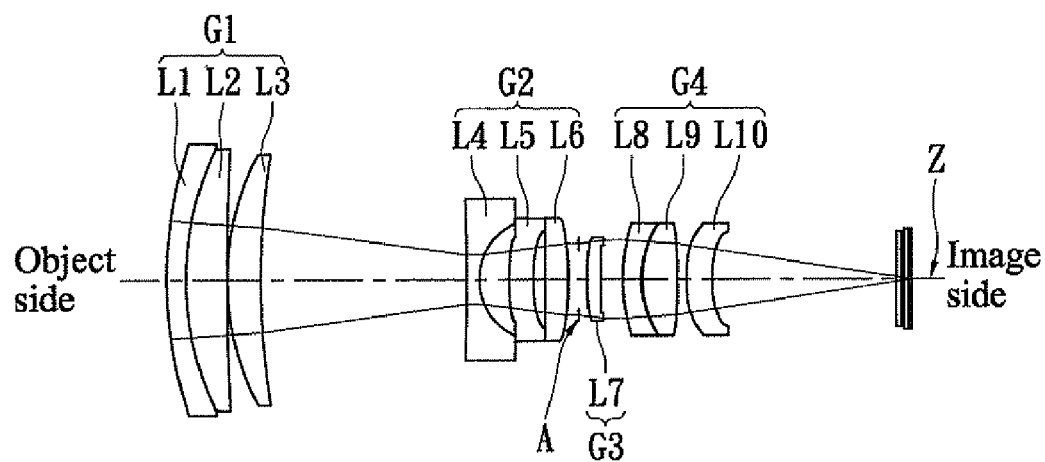

FIGS. 1A to 1C show schematic views of the lens groups arranged at wide-configuration (FIG. 1A), normal-configuration (FIG. 1B) and tele-configuration (FIG. 1C) according to the first embodiment of the present invention, respectively.

The zoom lens of the present invention may be composed of ten pieces of lens and includes a first lens group G1, a second lens group G2, a third lens group G3 and a fourth lens group G4. The refractive powers of the first lens group G1, the third lens group G3 and the fourth lens group G4 are positive, and refractive power of the second lens group G2 is negative. In addition, the focal length of the zoom lens is changeable according to the interval variation between any two lens groups arranged along the optical axis Z of the zoom lens.

In the preferred embodiment, the first lens group G1 may include a first lens L1, a second lens L2 and a third lens L3 that may be arranged along the optical axis Z in sequence. The second lens group G2 may include a fourth lens L4, a fifth lens L5 and a sixth lens L6 that may be arranged along the optical axis Z in sequence. The third lens group G3 may be at least one single seventh lens L7. The fourth lens group G4 may include an eighth lens L8, a ninth lens L9 and a tenth lens L10. In addition, the zoom lens has an aperture A arranged in front of the seventh lens L7, and the diameter of the aperture A is changeable. In other words, the aperture A may be arranged along the optical axis Z and between the second lens group G2 and the third lens group G3.

The fifth lens L5, the sixth lens L6, the seventh lens L7 and the ninth lens L9 may be made of plastic material and the other lens may be made of glass for preferred embodiment, so that the weight of the zoom lens is decreased effectively for driving the zoom lens easily. Hence, the zoom lens at least includes the following advantages: the size is compact and the image quality can be maintained. The numbers S1-S20 in FIG. 1B are serial numbers of optical surfaces of the lenses. The numbers D1-D20 in FIG. 1A are serial numbers of distances between every two optical surfaces of every two lenses.

In other words, the first lens group G1 is fixed at a predetermined position, the second lens group G2 is movable along the optical axis Z of the zoom lens in accordance with the change of the magnification of the zoom lens, the third lens group G3 has at least one lens (the seventh lens L7) that is fixed at a predetermined position, and the fourth lens group G4 is movable along the optical axis Z in order to keep an image plane generated by the zoom lens to be projected accurately onto an image sensor I.

Moreover, the first lens group G1, the second lens group G2, the third lens group G3 and the fourth lens group G4 conform to the following three conditions in order to achieve the objects of the zoom lens having small size and good image quality:

$$4.4 < F1/|F2| < 4.7; \quad \text{condition (1)}$$

$$1.2 < F1/F3 < 1.4; \text{ and} \quad \text{condition (2)}$$

$$1.1 < F4/(F_W F_T)^{1/2} < 1.4; \quad \text{condition (3)}$$

wherein F1 is the focal length of the first lens group G1, F2 is the focal length of the second lens group G2, F3 is the focal length of the third lens group G3, F4 is the focal length of the fourth lens group G4, $F_W$ is the focal length at wide-configuration of the zoom lens, and $F_T$ is the focal length at tele-configuration of the zoom lens.

Furthermore, the first lens group G1 and the second lens group G2 conform to the following two conditions:

$$1.9 < fl_{12}/fl_3 < 2.2; \text{ and} \quad \text{condition (1)}$$

$$3 < fl_{56}/fl_4 < 4; \quad \text{condition (2)}$$

wherein $fl_{12}$ is the focal length of the combination of the first lens L1 and the second lens L2 in the first lens group G1, $fl_3$ is the focal length of the third lens L3 in the first lens group G1, $fl_4$ is the focal length of the fourth lens L4 in the second lens group G2, and $fl_{56}$ is the focal length of the combination of the fifth lens L5 and the sixth lens L6 in the second lens group G2.

Moreover, the fourth lens group G4 conforms to the following two conditions in order to implement 5× zoom ratio:

$$2.2 < F_4/F_W < 2.7; \text{ and} \quad \text{condition (1)}$$

$$0.5 < F_4/F_T < 0.7; \quad \text{condition (2)}$$

wherein F4 is the focal length of the fourth lens group G4, $F_W$ is the focal length at wide-configuration of the zoom lens, and $F_T$ is the focal length at tele-configuration of the zoom lens.

In addition, the zoom lens may be applied to an image-capturing device such as conventional camera, digital camera or digital video camera etc. In other words, the first lens group G1, the second lens group G2, the third lens group G3 and the fourth lens group G4 may be assembled in the image-capturing device to applied to the image-capturing device.

Figure 1D:
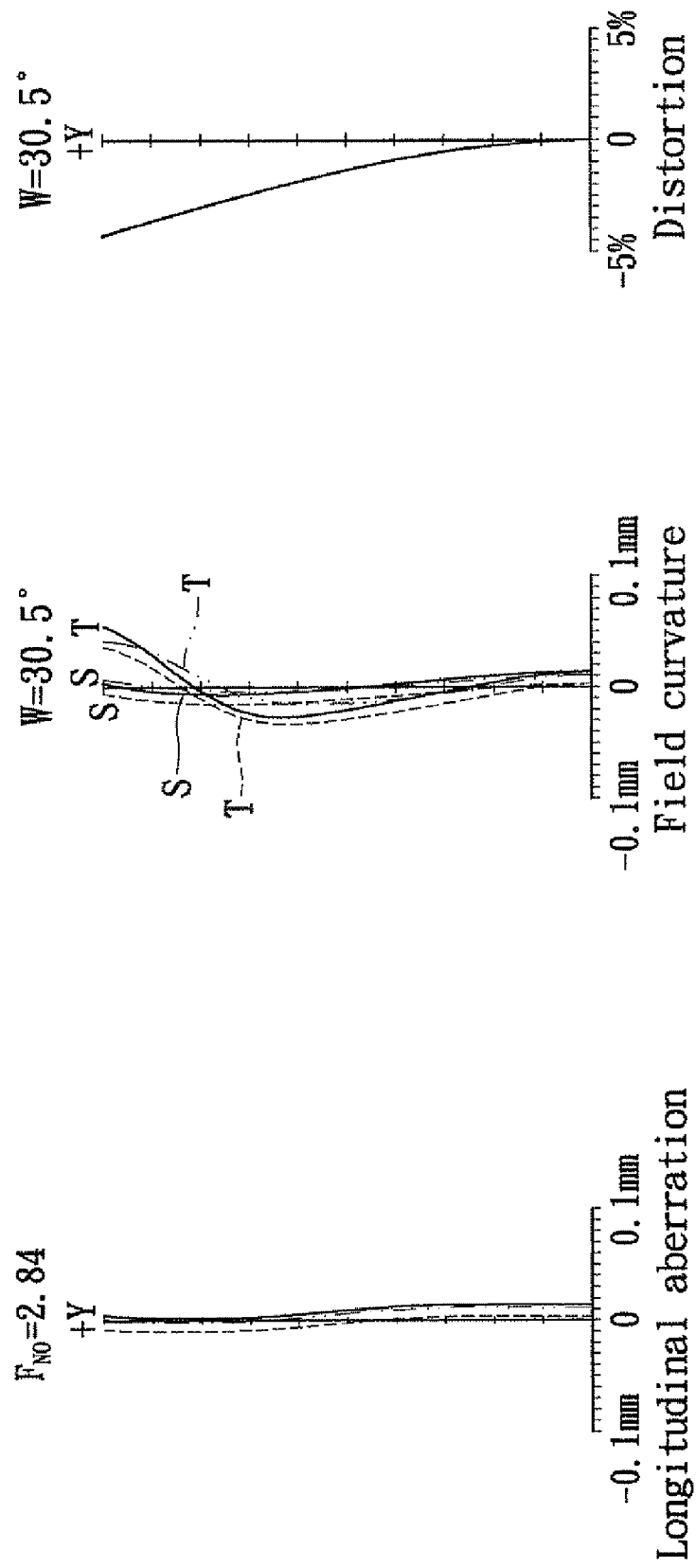
FIGS. 1D-1F are graphs showing longitudinal aberration (left), field curvature (middle) and distortion (right) of the zoom lens at wide-configuration, normal-configuration and tele-configuration according to the first embodiment of the present invention, respectively.
Figure 1E:
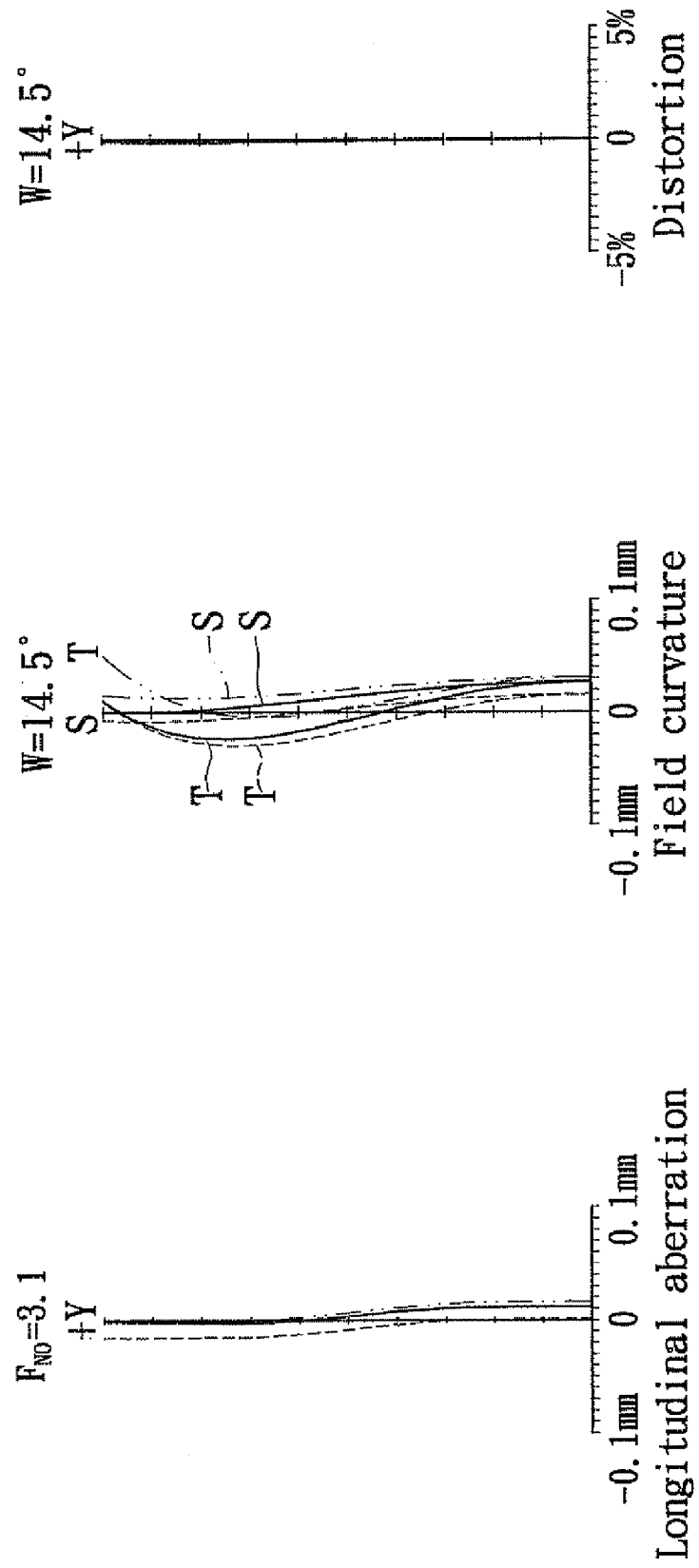
Figure 1F:
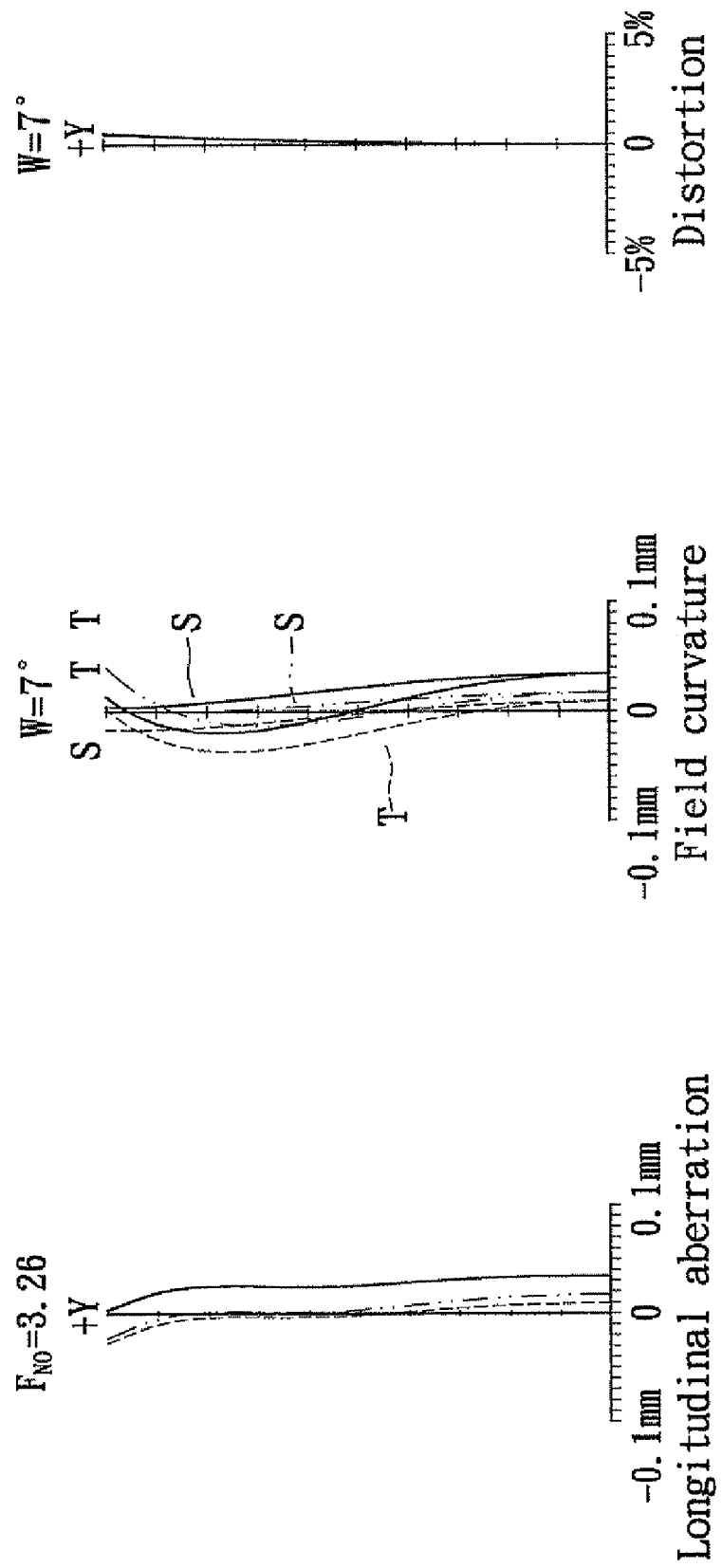

FIG. 1D is a graph showing longitudinal aberration (left), field curvature (middle) and distortion (right) of the zoom lens at wide-configuration according to the first embodiment of the present invention, respectively. FIG. 1E is a graph showing longitudinal aberration (left), field curvature (middle) and distortion (right) of the zoom lens at normal-configuration according to the first embodiment of the present invention, respectively. FIG. 1F is a graph showing longitudinal aberration (left), field curvature (middle) and distortion (right) of the zoom lens at tele-configuration according to the first embodiment of the present invention, respectively.

The simulation data of the first embodiment of the present invention are shown as the following table; wherein r shows curvature radius of optical surface of each lens (serial numbers are shown from S1 to S20), D shows axial distance between two optical surfaces of every two adjacent lenses (serial numbers are shown from D1 to D20), $n_d$ shows refractive index of optical surface of each lens, and $V_d$ shows Abbe value (Abbe value means chromatic dispersion of material) of optical surface of each lens.

| surface number | R (curvature radius) | D (distance) | $n_d$ (refractive index) | $V_d$ (Abbe value) |
|---|---|---|---|---|
| 1 | 35.112 | 1.509 | 1.85 | 23.8 |
| 2 | 22.417 | 3.379 | 1.62 | 63.3 |
| 3 | 133.992 | 0.100 | | |
| 4 | 21.844 | 2.747 | 1.64 | 60.1 |
| 5 | 60.016 | variable | | |
| 6 | −246.365 | 0.999 | 1.70 | 55.5 |
| 7 | 5.199 | 2.461 | | |
| 8 | 12.695 | 1.859 | 1.52 | 56.3 |
| 9 | 5.840 | 0.953 | | |
| 10 | 29.268 | 1.911 | 1.61 | 26.6 |
| 11 | −21.210 | variable | | |
| 12 | Infinity | 0.487 | | |
| 13 | 9.534 | 1.141 | 1.52 | 56.3 |
| 14 | 23.651 | variable | | |
| 15 | 14.758 | 1.474 | 1.92 | 18.9 |
| 16 | 7.910 | 0.100 | | |
| 17 | 6.702 | 3.040 | 1.52 | 56.3 |
| 18 | −33.817 | 0.500 | | |
| 19 | 12.094 | 2.203 | 1.52 | 56.3 |
| 20 | 18.044 | variable | | |

The relationships of the variance D5, D11, D14 and D20 relative to different zoom position are shown as the following table:

|     | Wide   | Normal | Tele   |
| --- | ------ | ------ | ------ |
| f   | 6.62   | 15.03  | 31.78  |
| $F_{NO}$ | 2.84 | 3.1  | 3.26   |
| 2ω  | 61°    | 29°    | 14°    |
| D5  | 1.699  | 10.449 | 16.645 |
| D11 | 16.047 | 7.297  | 1.101  |
| D14 | 5.484  | 3.132  | 1.985  |
| D20 | 11.465 | 13.817 | 14.964 |

Wherein f is system focal length at wide-configuration, normal-configuration and tele-configuration, $F_{NO}$ is aperture radius at wide-configuration, normal-configuration and tele-configuration, and 2ω) is view angle at wide-configuration, normal-configuration and tele-configuration.

Moreover, the optical surface S8, S11, S13, S14 and S17-S20 are aspherical surfaces, and the data of the aspherical surfaces are shown as the following table:

| Surface | K | $A_4$ | $A_6$ | $A_8$ | $A_{10}$ | $A_{12}$ |
| --- | --- | --- | --- | --- | --- | --- |
| S8  | 0 | −1.35E−03 | 4.07E−06  | 2.34E−06  | −7.55E−08 | 1.53E−11  |
| S9  | 0 | 2.42E−05  | −6.90E−05 | 6.09E−06  | −2.06E−07 | 1.71E−09  |
| S10 | 0 | 5.42E−05  | −7.03E−06 | 2.31E−06  | −2.17E−08 | −5.23E−12 |
| S11 | 0 | −2.75E−04 | −1.88E−05 | 4.83E−07  | −1.51E−08 | −2.56E−10 |
| S13 | 0 | 4.93E−04  | 1.60E−05  | 1.84E−06  | −1.49E−07 | 8.57E−09  |
| S14 | 0 | 7.24E−05  | 1.47E−05  | 3.02E−06  | −2.31E−07 | 1.13E−08  |
| S17 | 0 | −5.75E−04 | −4.32E−06 | −4.91E−07 | 2.04E−08  | −1.50E−09 |
| S18 | 0 | −2.91E−05 | 1.78E−06  | −1.19E−06 | 6.93E−08  | −1.42E−09 |
| S19 | 0 | 1.83E−04  | −7.02E−06 | 1.48E−07  | −2.56E−08 | 2.61E−09  |
| S20 | 0 | 2.22E−03  | 3.40E−05  | 2.86E−06  | −2.57E−07 | 1.28E−08  |

In addition, the aspherical surfaces in examples are represented by the following expression.

$$Z = \frac{CY^2}{1+\sqrt{(1-(K+1)C^2 Y^2)}} + A_4 Y^4 + A_6 Y^6 + A_8 Y^8 + A_{10} Y^{10} + A_{12} Y^{12}.$$

wherein Z is sag, C (=1/r) is the curvature of aspherical surface, K is the conic constant, Y is high vertical to the optical axis Z, and A4, A6, A8, A10 and A12 respectively are the $4^{th}$, $6^{th}$, $8^{th}$, $10^{th}$ and $12^{th}$ aspherical coefficients.

Figure 2A:
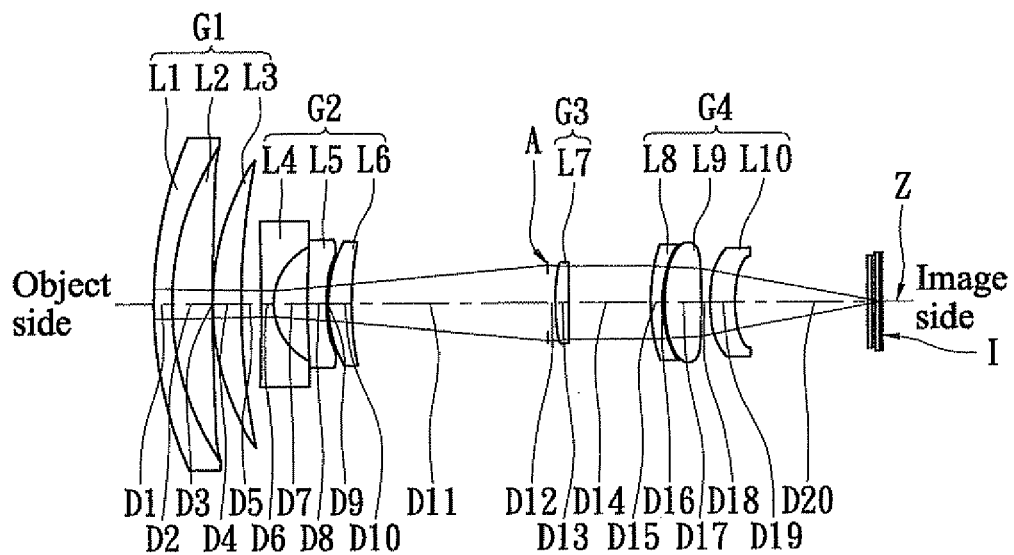
FIGS. 2A-2C are schematic views of the lens groups arranged at wide-configuration, normal-configuration and tele-configuration according to the second embodiment of the present invention, respectively.
Figure 2B:
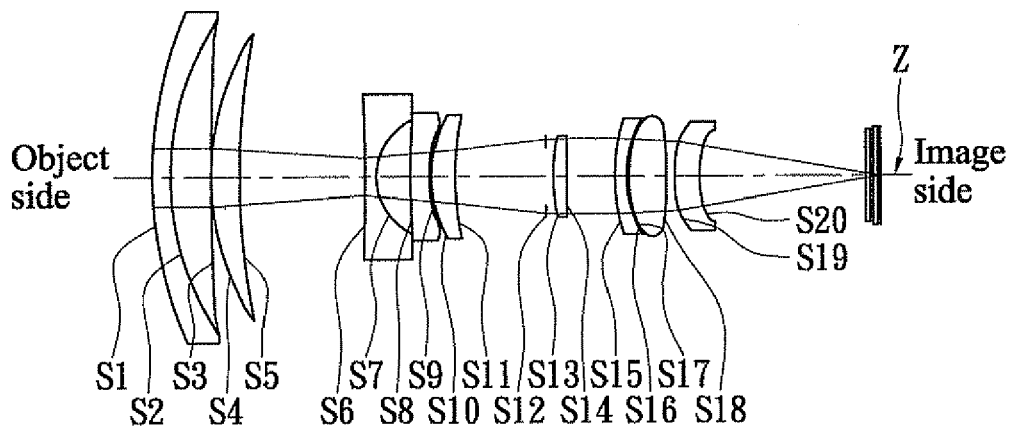
Figure 2C:
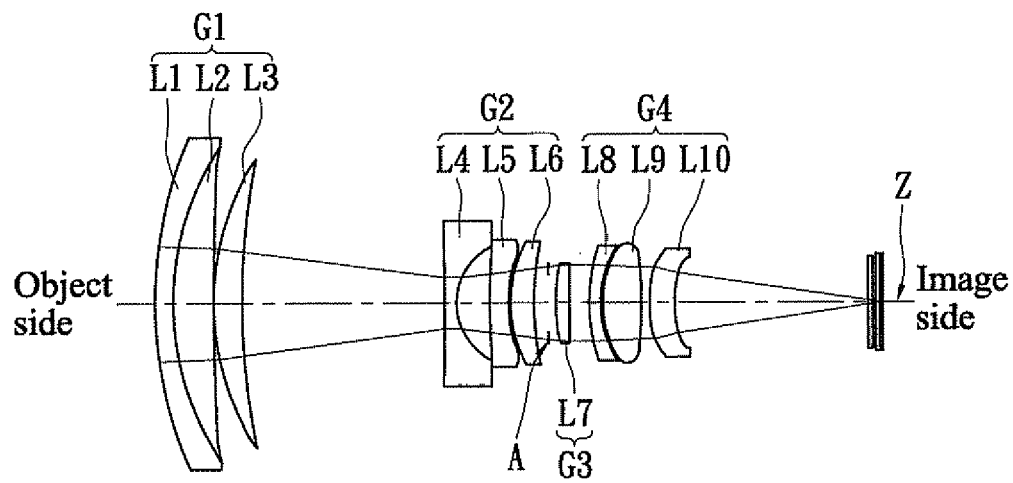
Figure 2D:
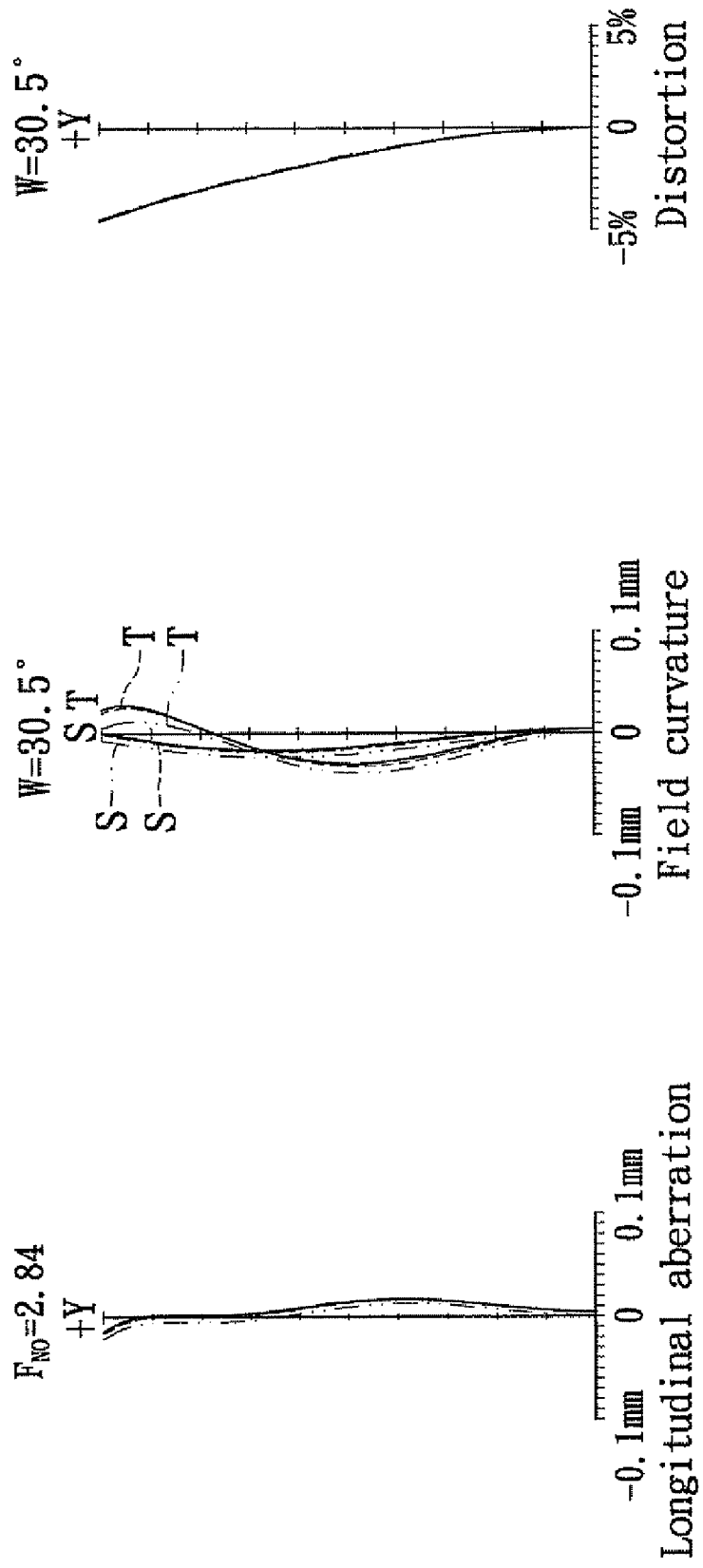
FIGS. 2D-2F are graphs showing longitudinal aberration (left), field curvature (middle) and distortion (right) of the zoom lens at wide-configuration, normal-configuration and tele-configuration according to the second embodiment of the present invention, respectively.
Figure 2E:
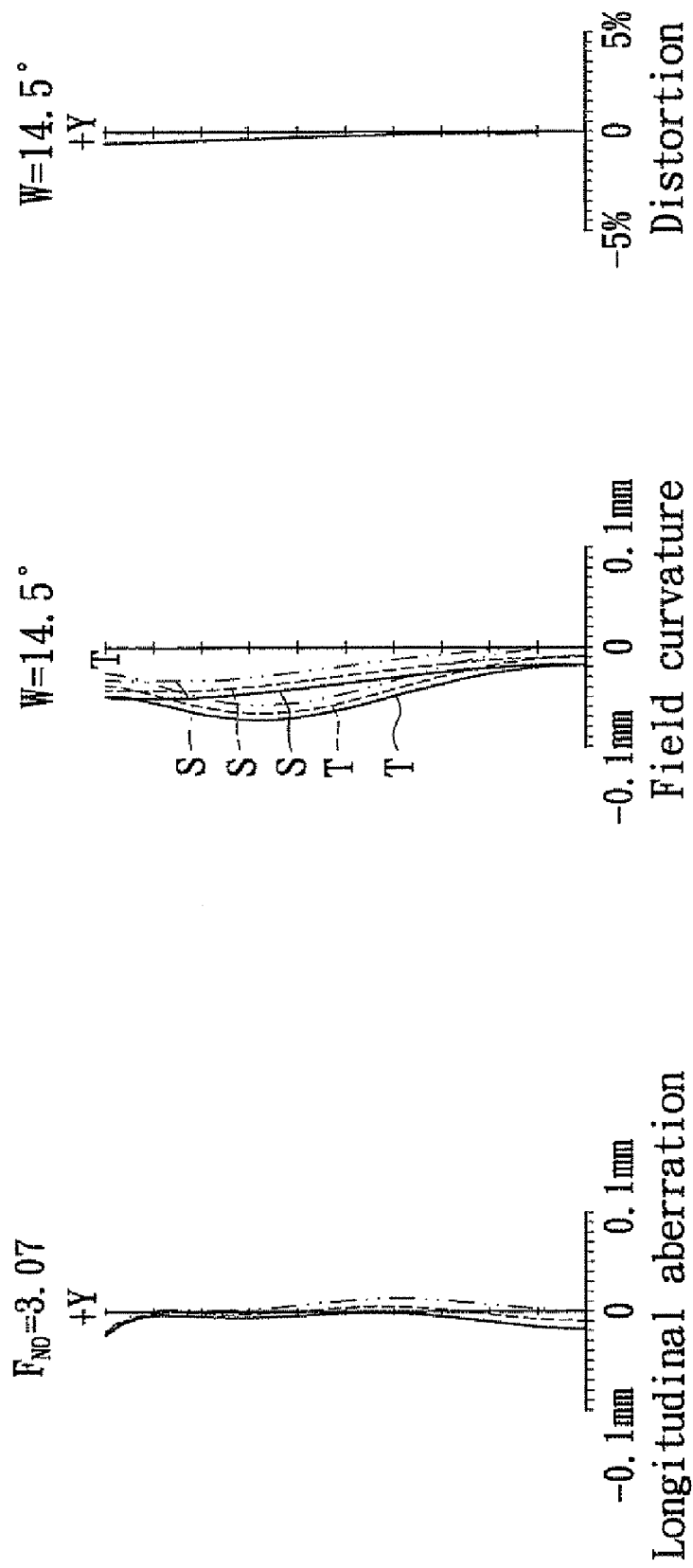
Figure 2F:
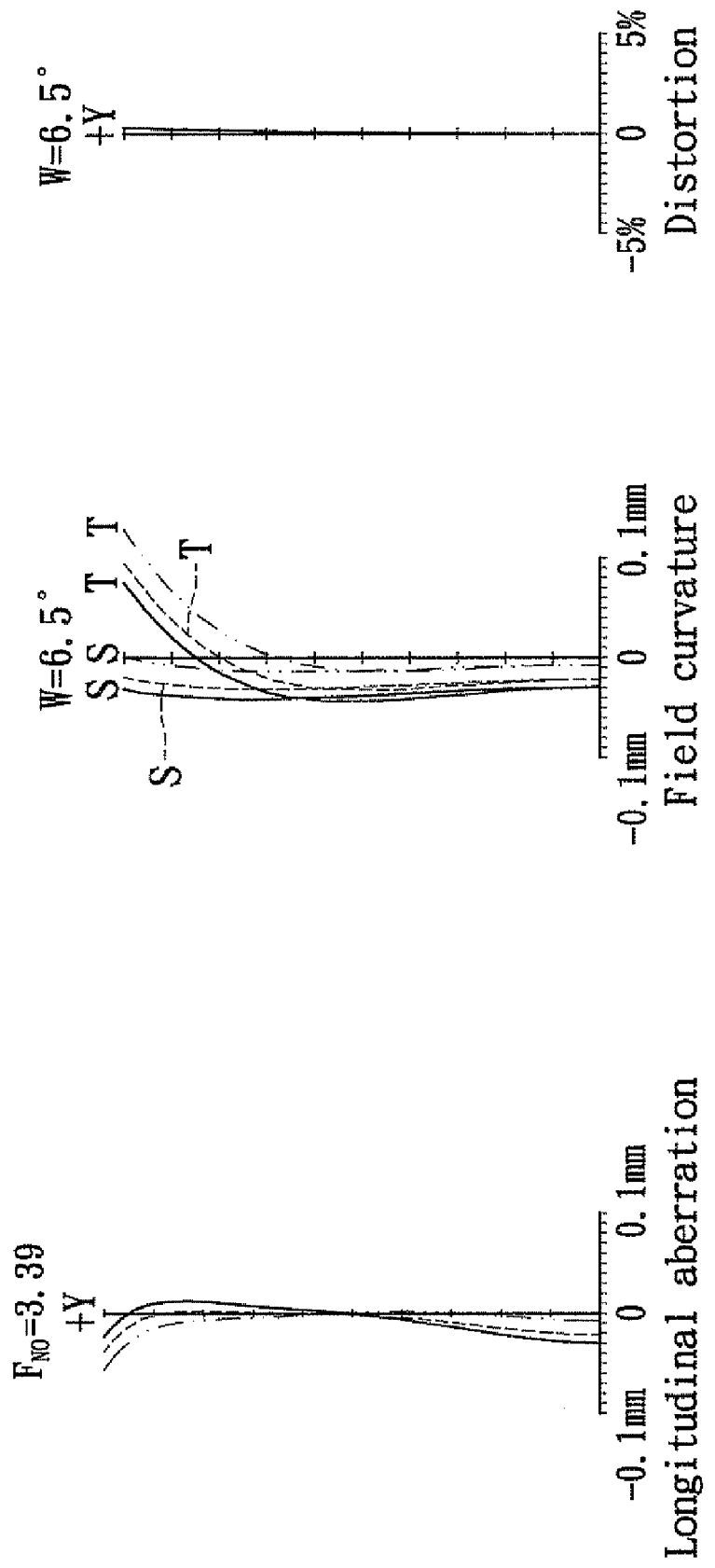

FIGS. 2A to 2C show schematic views of the lens groups arranged at wide-configuration (FIG. 2A), normal-configuration (FIG. 2B) and tele-configuration (FIG. 2C) according to the second embodiment of the present invention, respectively. Hence, the second embodiment is composed of ten pieces of lens that are the same as the first embodiment. FIG. 2D is a graph showing longitudinal aberration (left), field curvature (middle) and distortion (right) of the zoom lens at wide-configuration according to the second embodiment of the present invention, respectively. FIG. 2E is a graph showing longitudinal aberration (left), field curvature (middle) and distortion (right) of the zoom lens at normal-configuration according to the second embodiment of the present invention, respectively. FIG. 2F is a graph showing longitudinal aberration (left), field curvature (middle) and distortion (right) of the zoom lens at tele-configuration according to the second embodiment of the present invention, respectively.

The simulation data of the second embodiment of the present invention are shown as the following table.

| surface number | R (curvature radius) | D (distance) | $n_d$ (refractive index) | $V_d$ (Abbe value) |
| --- | --- | --- | --- | --- |
| 1  | 35.980   | 1.528    | 1.85 | 23.3 |
| 2  | 22.446   | 3.123    | 1.64 | 62.0 |
| 3  | 114.837  | 0.100    |      |      |
| 4  | 22.008   | 2.499    | 1.64 | 60.2 |
| 5  | 58.212   | variable |      |      |
| 6  | −100.217 | 0.999    | 1.65 | 60.2 |
| 7  | 5.373    | 2.719    |      |      |
| 8  | 21.341   | 1.590    | 1.52 | 55.4 |
| 9  | 7.028    | 0.390    |      |      |
| 10 | 11.872   | 2.011    | 1.61 | 25.6 |
| 11 | 961.695  | variable |      |      |
| 12 | Infinity | 0.489    |      |      |
| 13 | 9.997    | 1.140    | 1.52 | 66.1 |
| 14 | 30.163   | variable |      |      |
| 15 | 16.568   | 0.899    | 1.92 | 22.4 |
| 16 | 8.801    | 0.095    |      |      |

-continued

| surface number | R (curvature radius) | D (distance) | $n_d$ (refractive index) | $V_d$ (Abbe value) |
| --- | --- | --- | --- | --- |
| 17 | 6.951   | 3.163    | 1.52 | 70.3 |
| 18 | −37.327 | 0.500    |      |      |
| 19 | 8.597   | 2.203    | 1.52 | 70.0 |
| 20 | 10.498  | variable |      |      |

The relationships of the variance D5, D11, D14 and D20 relative to different zoom position are shown as the following table:

|     | Wide   | Normal | Tele   |
| --- | ------ | ------ | ------ |
| f   | 6.62   | 15.03  | 33     |
| $F_{NO}$ | 2.84 | 3.07 | 3.39 |
| 2ω  | 61     | 29     | 13     |
| d5  | 1.702  | 10.472 | 16.750 |
| d11 | 16.040 | 7.272  | 1.000  |
| d14 | 7.024  | 4.261  | 2.001  |
| d20 | 11.393 | 14.156 | 16.415 |

Moreover, the optical surface S8, S11, S13, S14 and S17-S20 are aspherical surfaces, and the data of the aspherical surfaces are shown as the following table:

| Surface | K | $A_4$ | $A_6$ | $A_8$ | $A_{10}$ | $A_{12}$ |
|---|---|---|---|---|---|---|
| S8  | 0 | −9.86E−04 | 1.71E−06  | 1.69E−06  | −7.73E−08 | 9.56E−10  |
| S9  | 0 | −1.42E−03 | −8.21E−05 | 6.30E−09  | −2.14E−07 | 1.65E−09  |
| S10 | 0 | 8.20E−04  | −6.61E−05 | 2.89E−06  | −2.47E−08 | −5.39E−10 |
| S11 | 0 | 2.60E−04  | 1.45E−05  | −3.46E−07 | 3.24E−08  | 0.00E+00  |
| S13 | 0 | 9.71E−05  | 9.87E−06  | 1.08E−06  | −1.51E−07 | 7.83E−09  |
| S14 | 0 | 2.72E−04  | −4.47E−06 | 3.42E−06  | −2.90E−07 | 1.11E−08  |
| S17 | 0 | −4.99E−04 | −1.20E−06 | 3.26E−07  | 1.70E−08  | −1.81E−09 |
| S18 | 0 | −5.31E−04 | −7.01E−06 | −6.27E−07 | 5.34E−08  | −1.98E−09 |
| S19 | 0 | 1.48E−03  | −3.50E−06 | 3.95E−07  | −1.04E−07 | 2.10E−09  |
| S20 | 0 | 2.55E−03  | 3.72E−05  | 3.02E−06  | −4.48E−07 | 1.16E−08  |

Figure 3A:
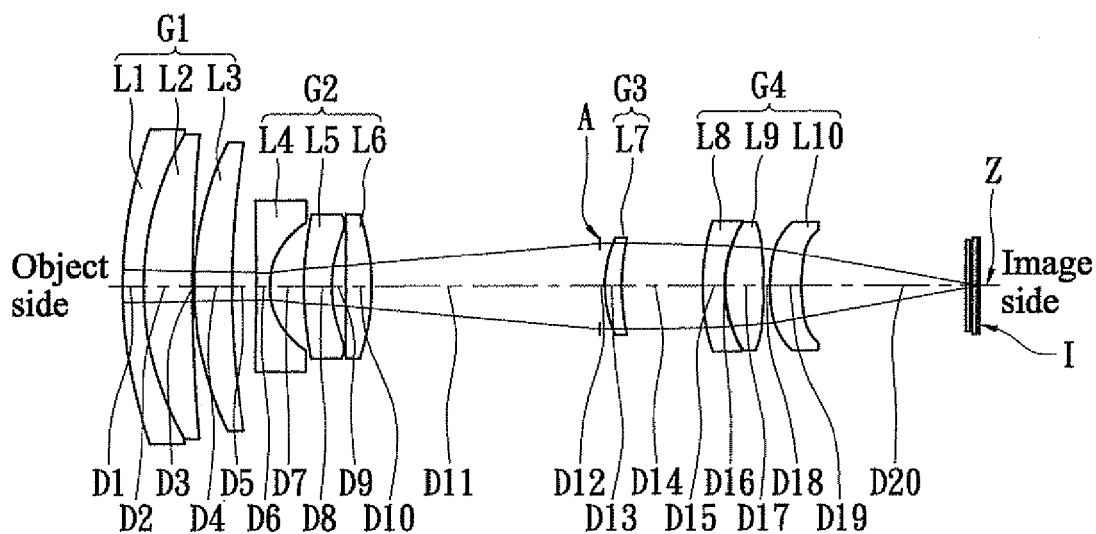
FIGS. 3A-3C are schematic views of the lens groups arranged at wide-configuration, normal-configuration and tele-configuration according to the third embodiment of the present invention, respectively.
Figure 3B:
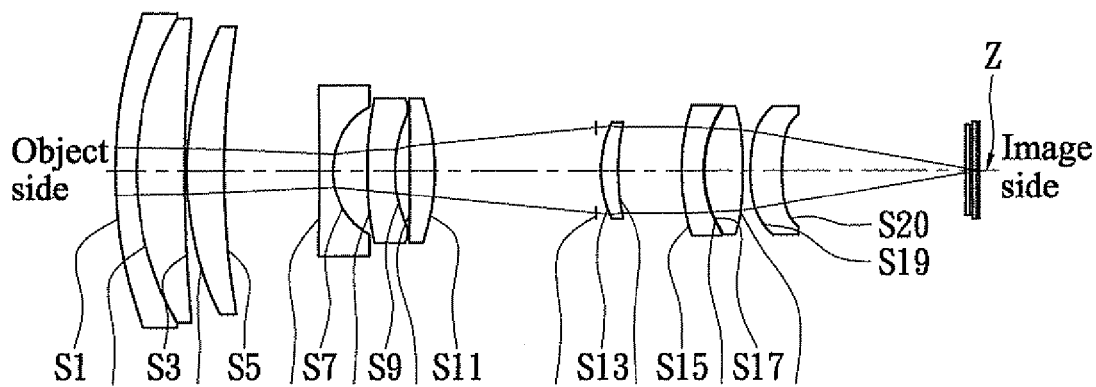
Figure 3C:
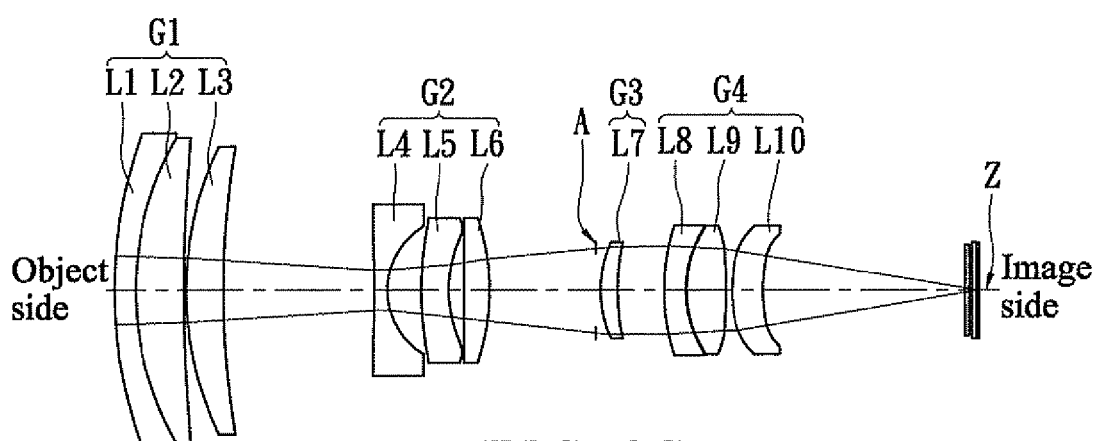
Figure 3D:
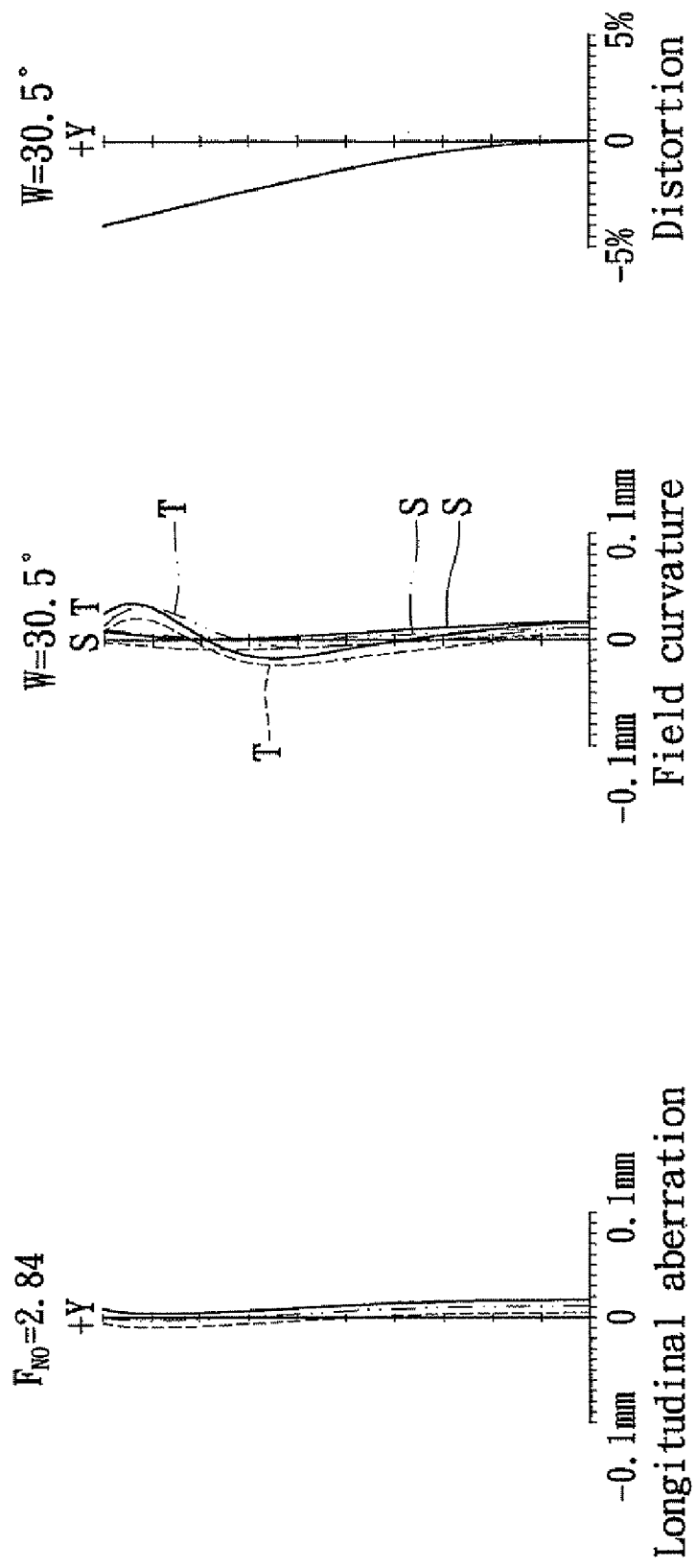
FIGS. 3D-3F are graphs showing longitudinal aberration (left), field curvature (middle) and distortion (right) of the zoom lens at wide-configuration, normal-configuration and tele-configuration according to the third embodiment of the present invention, respectively.
Figure 3E:
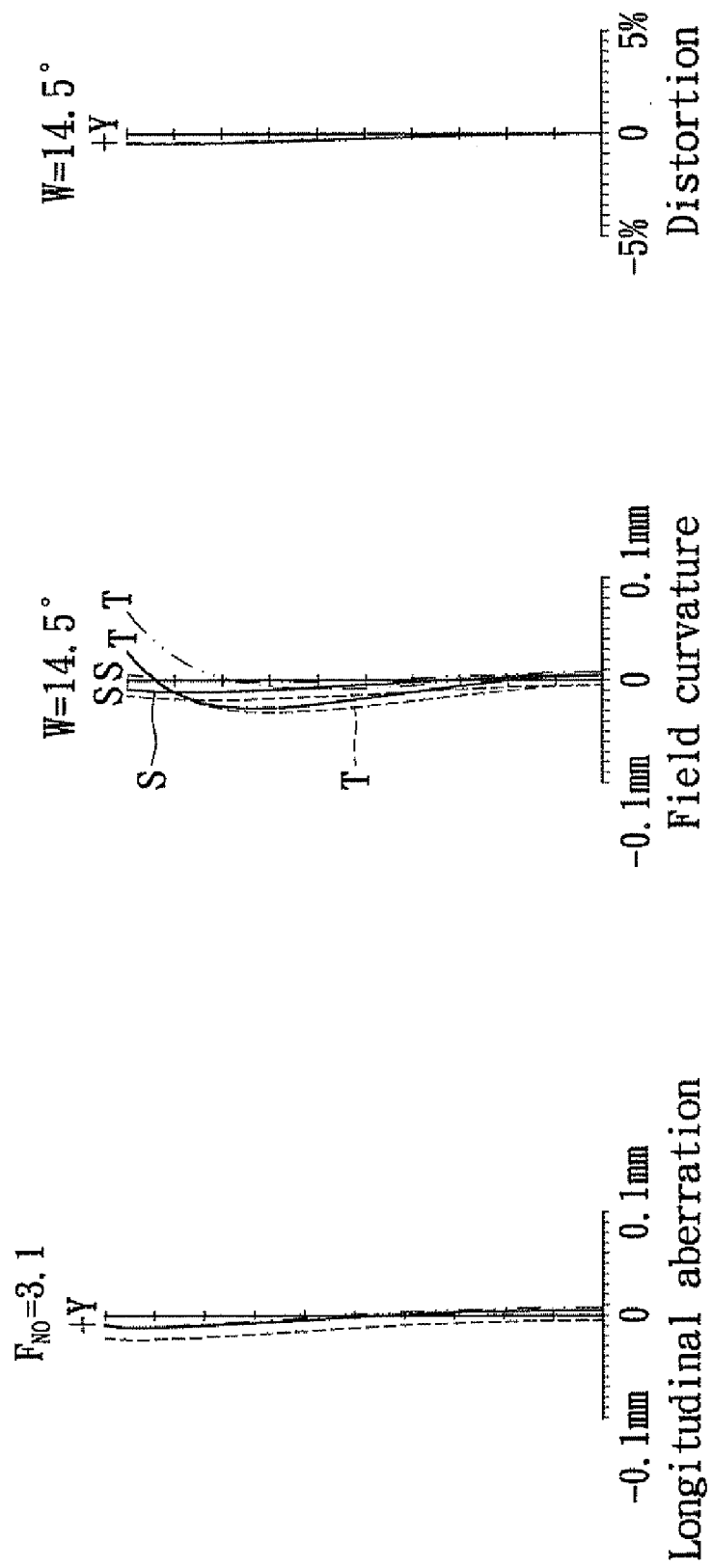
Figure 3F:
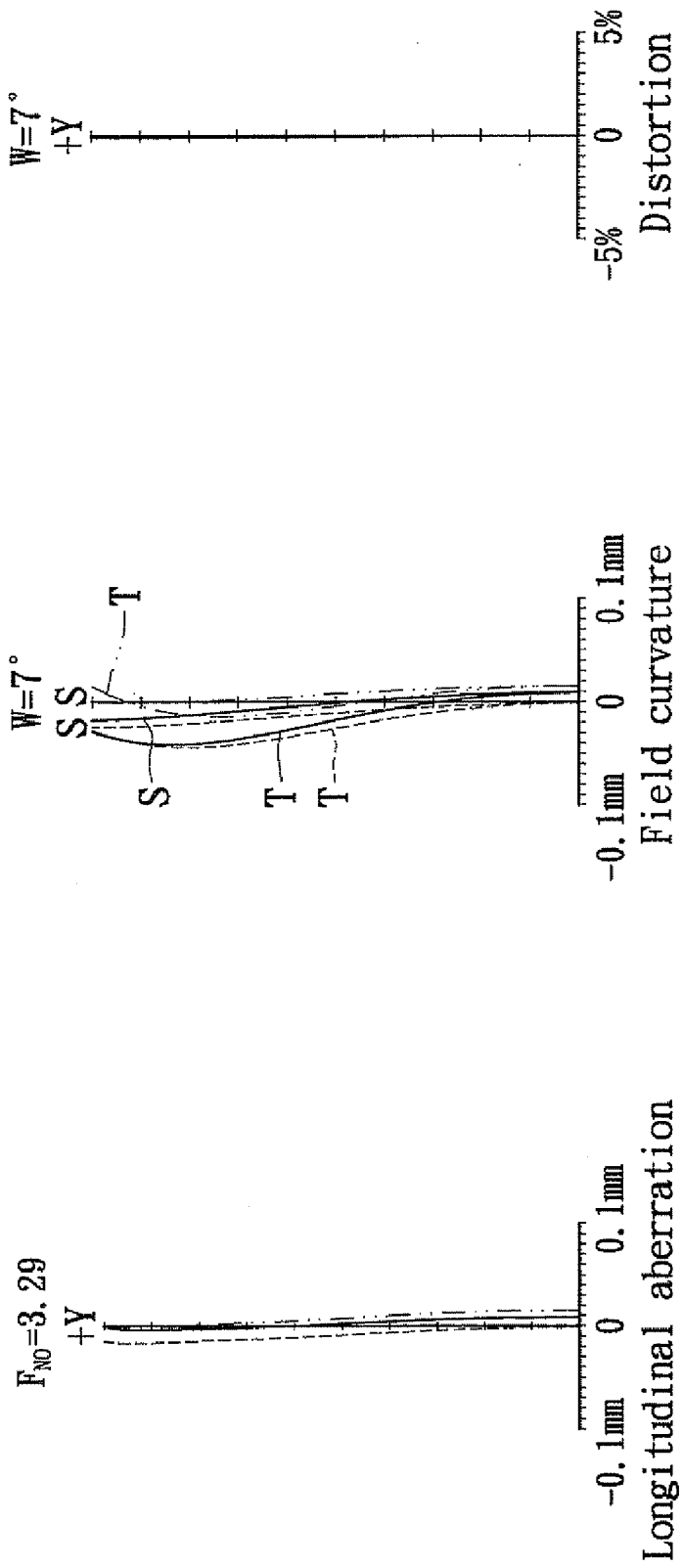

FIGS. 3A to 3C show schematic views of the lens groups arranged at wide-configuration (FIG. 3A), normal-configuration (FIG. 3B) and tele-configuration (FIG. 3C) according to the third embodiment of the present invention, respectively. Hence, the third embodiment is composed of ten pieces of lenses that are the same as the first embodiment. FIG. 3D is a graph showing longitudinal aberration (left), field curvature (middle) and distortion (right) of the zoom lens at wide-configuration according to the third embodiment of the present invention, respectively. FIG. 3E is a graph showing longitudinal aberration (left), field curvature (middle) and distortion (right) of the zoom lens at normal-configuration according to the third embodiment of the present invention, respectively. FIG. 3F is a graph showing longitudinal aberration (left), field curvature (middle) and distortion (right) of the zoom lens at tele-configuration according to the third embodiment of the present invention, respectively.

The simulation data of the third embodiment of the present invention are shown as the following table.

| surface number | R (curvature radius) | D (distance) | $n_d$ (refractive index) | $V_d$ (Abbe value) |
|---|---|---|---|---|
| 1  | 32.678   | 1.489    | 1.85 | 23.8 |
| 2  | 21.42    | 3.461    | 1.62 | 63.3 |
| 3  | 114.735  | 0.1      |      |      |
| 4  | 22.48    | 2.661    | 1.64 | 60.1 |
| 5  | 59.863   | variable |      |      |
| 6  | −340.614 | 0.999    | 1.70 | 55.5 |
| 7  | 5.203    | 2.431    |      |      |
| 8  | 12.672   | 1.939    | 1.52 | 56.3 |
| 9  | 5.84     | 0.953    |      |      |

-continued

| surface number | R (curvature radius) | D (distance) | $n_d$ (refractive index) | $V_d$ (Abbe value) |
|---|---|---|---|---|
| 10 | 29.268   | 1.883    | 1.61 | 26.6 |
| 11 | −21.784  | variable |      |      |
| 12 | Infinity | 0.8908   |      |      |
| 13 | 9.522    | 1.141    | 1.52 | 56.3 |
| 14 | 24.594   | variable |      |      |
| 15 | 15.175   | 1.488    | 1.92 | 18.9 |
| 16 | 8.043    | 0.1      |      |      |
| 17 | 6.697    | 2.726    | 1.52 | 56.3 |
| 18 | −38.234  | 0.5      |      |      |
| 19 | 12.0865  | 2.201    | 1.52 | 56.3 |
| 20 | 18.832   | variable |      |      |

The relationships of the variance D5, D11, D14 and D20 relative to different zoom position are shown as the following table:

|  | Wide | Normal | Tele |
|---|---|---|---|
| f        | 6.62   | 15.03  | 31.77  |
| $F_{NO}$ | 2.84   | 3.1    | 3.29   |
| 2ω       | 61     | 29     | 14     |
| d5       | 1.700  | 10.478 | 16.645 |
| d11      | 15.645 | 6.867  | 0.699  |
| d14      | 5.770  | 3.345  | 2.025  |
| d20      | 11.480 | 13.905 | 15.225 |

Moreover, the optical surface S8, S11, S13, S14 and S17-S20 are aspherical surfaces, and the data of the aspherical surfaces are shown as the following table:

| Surface | K | $A_4$ | $A_6$ | $A_8$ | $A_{10}$ | $A_{12}$ |
|---|---|---|---|---|---|---|
| S8  | 0 | −1.32E−03 | 3.49E−06  | 2.30E−06  | −6.65E−08 | −3.69E−10 |
| S9  | 0 | −2.43E−03 | −6.91E−06 | 6.09E−06  | −2.06E−07 | 1.71E−09  |
| S10 | 0 | 5.42E−05  | −7.03E−05 | 2.31E−06  | −2.17E−08 | −5.23E−12 |
| S11 | 0 | −2.62E−05 | −1.88E−05 | 4.97E−07  | −1.58E−08 | −2.18E−10 |
| S13 | 0 | 4.71E−04  | 1.51E−05  | 1.90E−06  | −1.55E−07 | 1.04E−08  |
| S14 | 0 | 6.94E−04  | 1.78E−05  | 2.23E−06  | −1.50E−07 | 9.08E−09  |
| S17 | 0 | −5.91E−04 | −3.31E−06 | −5.05E−07 | 2.36E−08  | −1.77E−09 |
| S18 | 0 | −3.33E−06 | −1.49E−05 | −1.40E−06 | 6.71E−08  | −1.10E−09 |
| S19 | 0 | 1.89E−04  | −6.05E−06 | 1.21E−07  | −3.04E−08 | 2.51E−09  |
| S20 | 0 | 2.26E−04  | 2.95E−05  | 3.59E−06  | −3.00E−08 | 1.40E−08  |

Figure 4A:
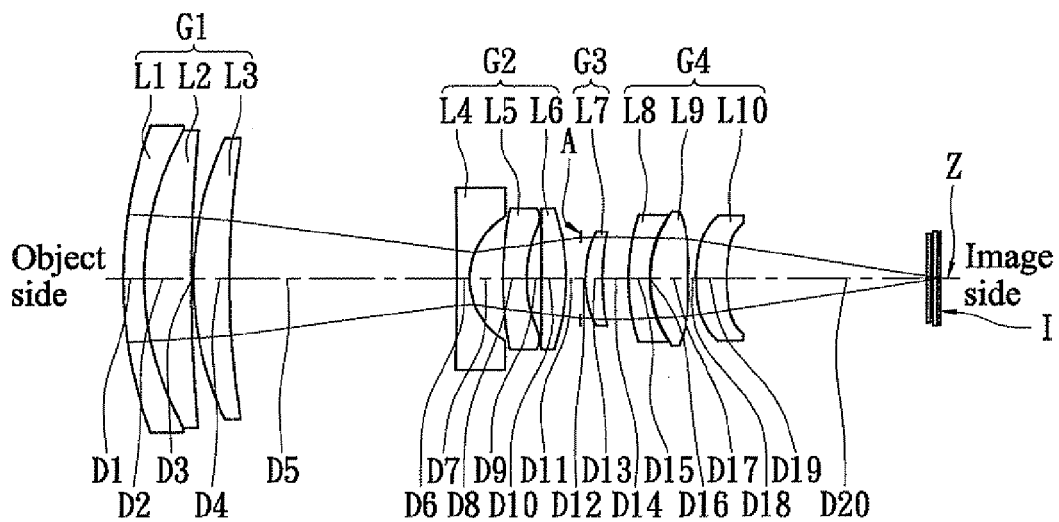
FIGS. 4A-4C are schematic views of the lens groups arranged at wide-configuration, normal-configuration and tele-configuration according to the fourth embodiment of the present invention, respectively.
Figure 4B:
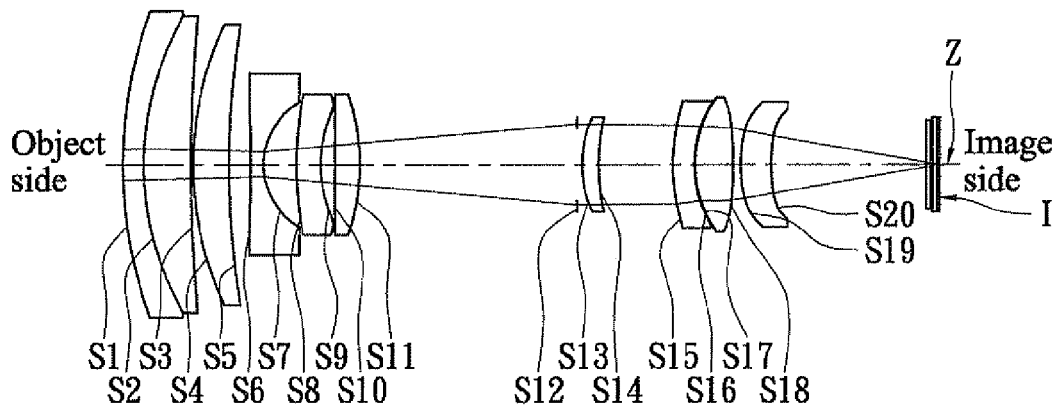
Figure 4C:
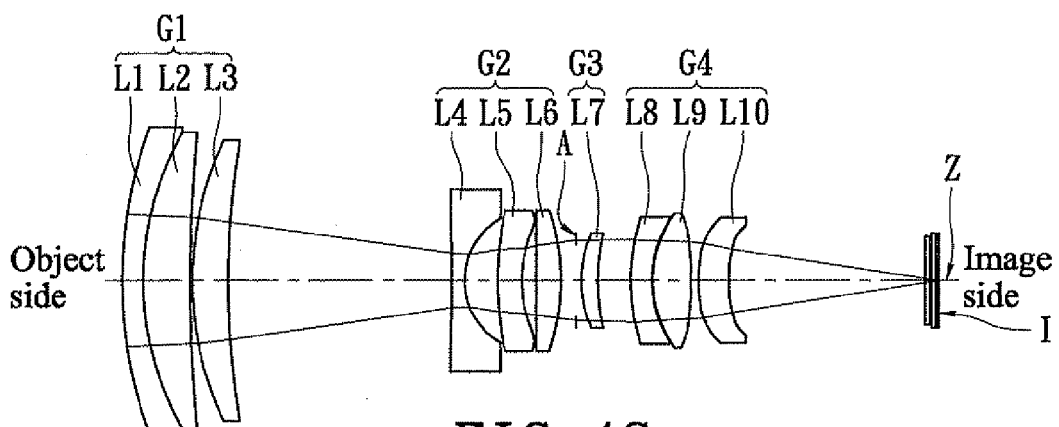
Figure 4D:
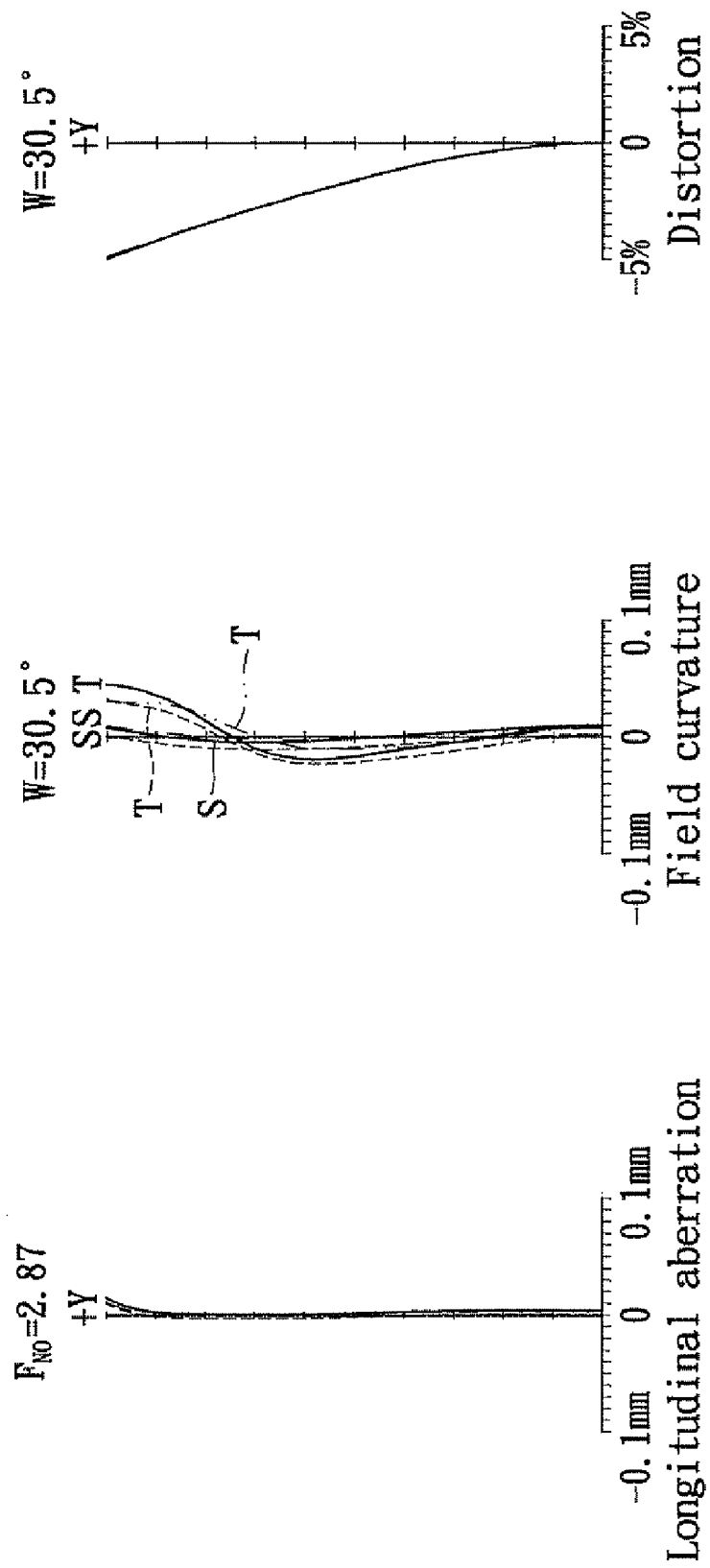
FIGS. 4D-4F are graphs showing longitudinal aberration (left), field curvature (middle) and distortion (right) of the zoom lens at wide-configuration, normal-configuration and tele-configuration according to the fourth embodiment of the present invention, respectively.
Figure 4E:
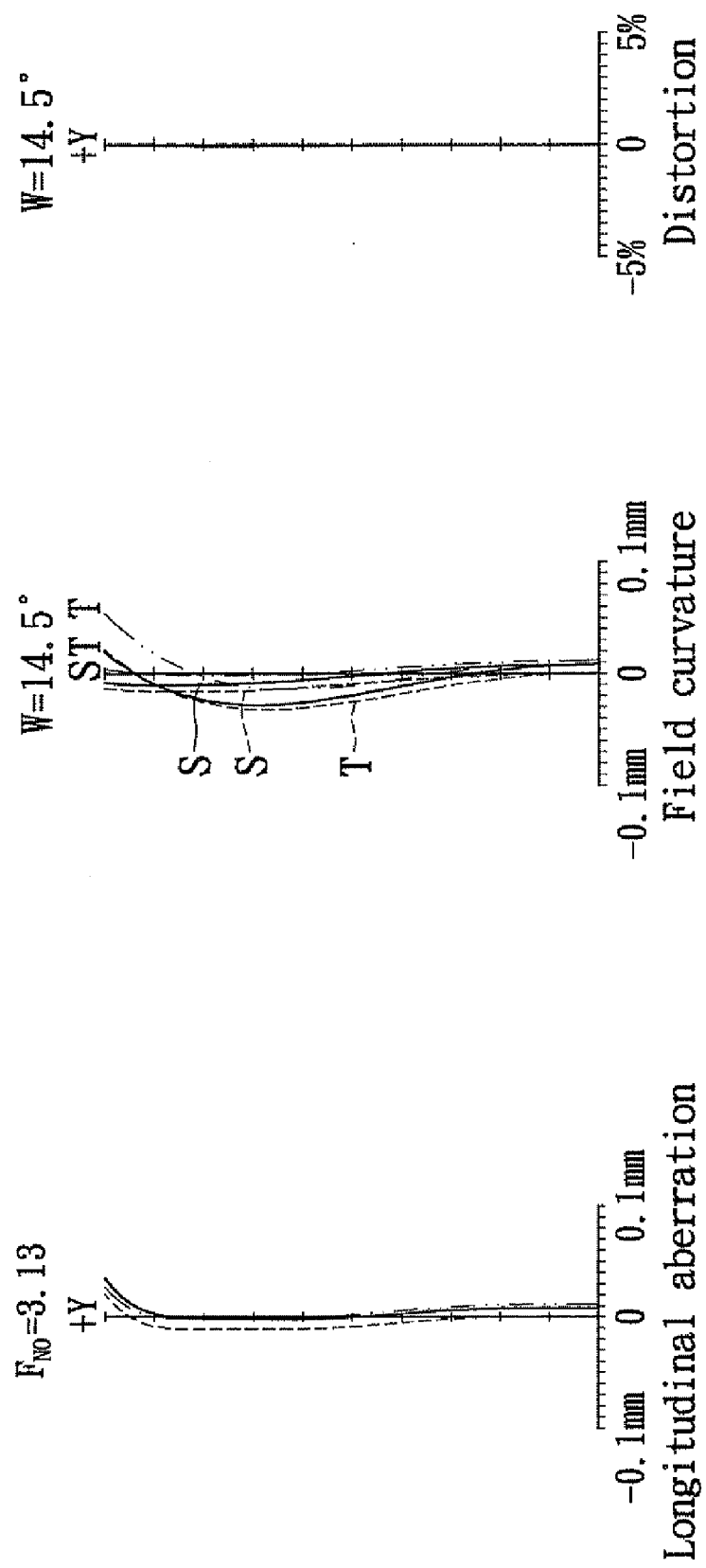
Figure 4F:
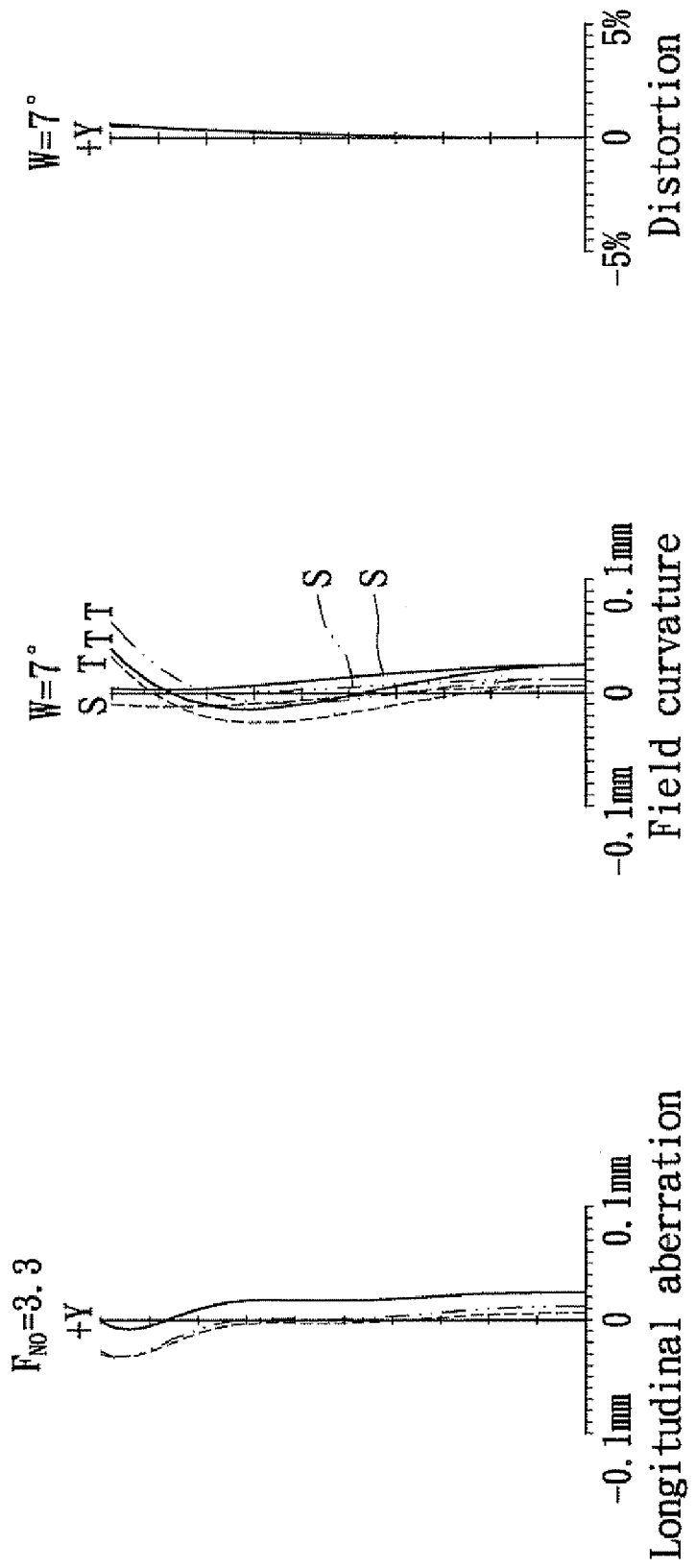

FIGS. 4A to 4C show schematic views of the lens groups arranged at wide-configuration (FIG. 4A), normal-configuration (FIG. 4B) and tele-configuration (FIG. 4C) according to the fourth embodiment of the present invention, respectively. Hence, the fourth embodiment is composed of ten pieces of lens that are the same as the first embodiment. FIG. 4D is a graph showing longitudinal aberration (left), field curvature (middle) and distortion (right) of the zoom lens at wide-configuration according to the fourth embodiment of the present invention, respectively. FIG. 4E is a graph showing longitudinal aberration (left), field curvature (middle) and distortion (right) of the zoom lens at normal-configuration according to the fourth embodiment of the present invention, respectively. FIG. 4F is a graph showing longitudinal aberration (left), field curvature (middle) and distortion (right) of the zoom lens at tele-configuration according to the fourth embodiment of the present invention, respectively.

The simulation data of the fourth embodiment of the present invention are shown as the following table.

| surface number | R (curvature radius) | D (distance) | $n_d$ (refractive index) | $V_d$ (Abbe value) |
|---|---|---|---|---|
| 1 | 24.831 | 1.067 | 1.85 | 23.8 |
| 2 | 15.853 | 2.389 | 1.62 | 63.3 |
| 3 | 94.759 | 0.07 | | |
| 4 | 15.448 | 1.943 | 1.64 | 60.1 |
| 5 | Infinity | variable | | |
| 6 | −174.229 | 0.707 | 1.70 | 55.5 |
| 7 | 3.677 | 1.74 | | |
| 8 | 8.978 | 1.315 | 1.52 | 56.3 |
| 9 | 4.13 | 0.674 | | |
| 10 | 20.698 | 1.351 | 1.61 | 26.6 |
| 11 | −15.000 | variable | | |
| 12 | Infinity | 0.345 | | |
| 13 | 6.742 | 0.807 | 1.52 | 56.3 |
| 14 | 16.726 | variable | | |
| 15 | 10.437 | 1.043 | 1.92 | 18.9 |
| 16 | 5.594 | 0.071 | | |
| 17 | 4.739 | 2.15 | 1.52 | 56.3 |
| 18 | −23.915 | 0.354 | | |
| 19 | 8.553 | 1.558 | 1.52 | 56.3 |
| 20 | 12.761 | variable | | |

The relationships of the variance D5, D11, D14 and D20 relative to different zoom position are shown as the following table:

| | Wide | Normal | Tele |
|---|---|---|---|
| f | 4.68 | 10.63 | 22.47 |
| $F_{NO}$ | 2.87 | 3.13 | 3.3 |
| 2ω | 61 | 29 | 14 |
| d5 | 1.209 | 7.39 | 11.772 |
| d11 | 11.348 | 5.161 | 0.779 |
| d14 | 3.878 | 2.215 | 1.404 |
| d20 | 8.108 | 9.772 | 10.583 |

Moreover, the optical surface S8, S11, S13, S14 and S17-S20 are aspherical surfaces, and the data of the aspherical surfaces are shown as the following table:

| Surface | K | $A_4$ | $A_6$ | $A_8$ | $A_{10}$ | $A_{12}$ |
|---|---|---|---|---|---|---|
| S8  | 0 | −3.81E−03 | 2.31E−06  | 2.64E−05  | −2.16E−07 | 6.89E−09 |
| S9  | 0 | −6.85E−04 | −3.90E−04 | 6.89E−05  | −4.66E−06 | 7.74E−08 |
| S10 | 0 | 1.53E−04  | −3.97E−04 | 2.61E−05  | −4.90E−07 | −2.36E−10 |
| S11 | 0 | −7.77E−04 | −1.06E−04 | 5.46E−06  | −3.42E−07 | 1.16E−09 |
| S13 | 0 | 1.39E−03  | −1.27E−06 | 2.08E−05  | −3.36E−06 | 3.87E−07 |
| S14 | 0 | 2.05E−03  | 8.33E−05  | 3.41E−05  | −5.22E−06 | 5.13E−07 |
| S17 | 0 | −1.63E−03 | −1.39E−04 | −5.55E−06 | 4.60E−07  | −6.76E−08 |
| S18 | 0 | −8.22E−05 | −1.00E−04 | 1.29E−06  | 1.57E−06  | −6.44E−08 |
| S19 | 0 | 5.17E−03  | −3.97E−05 | 1.67E−06  | −5.78E−07 | 1.18E−07 |
| S20 | 0 | 6.29E−03  | −1.24E−04 | 3.22E−05  | −5.82E−06 | 5.78E−07 |

Figure 5A:
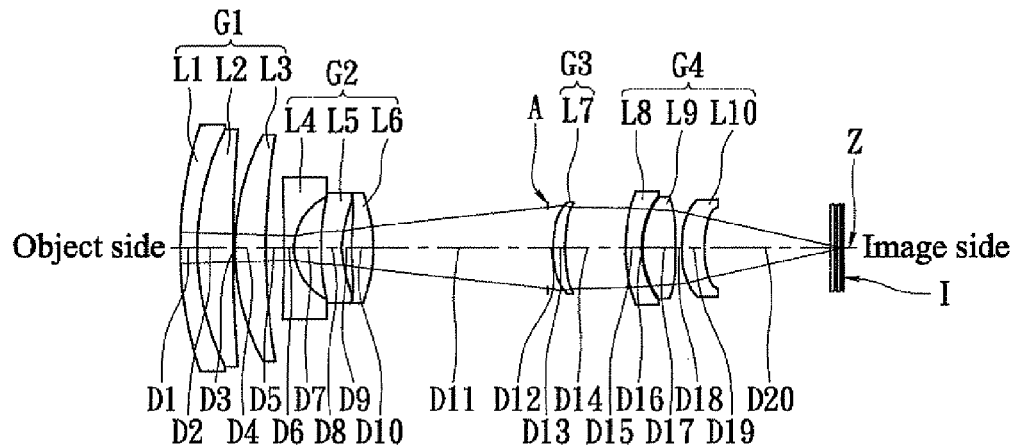
FIGS. 5A-5C are schematic views of the lens groups arranged at wide-configuration, normal-configuration and tele-configuration according to the fifth embodiment of the present invention, respectively.
Figure 5B:
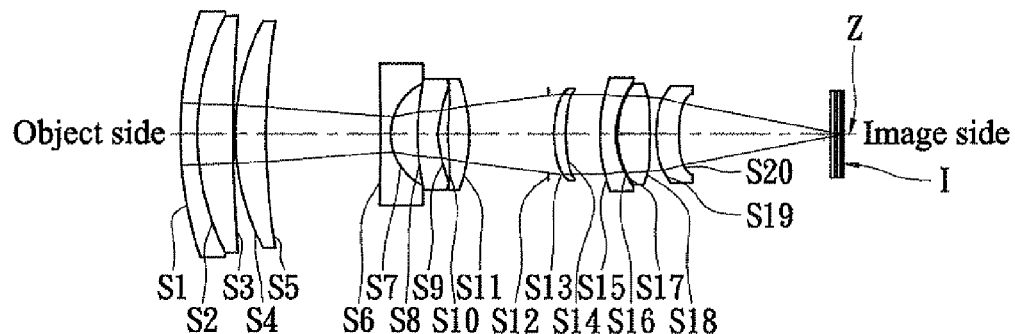
Figure 5C:
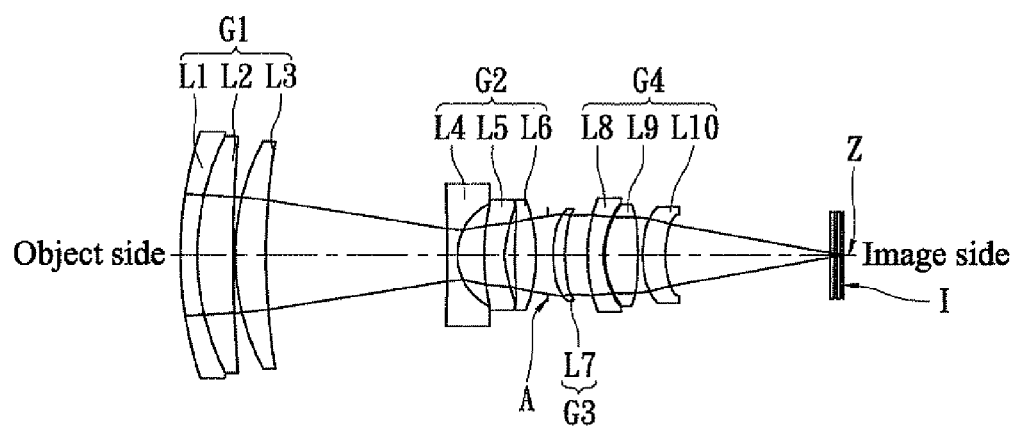
Figure 5D:
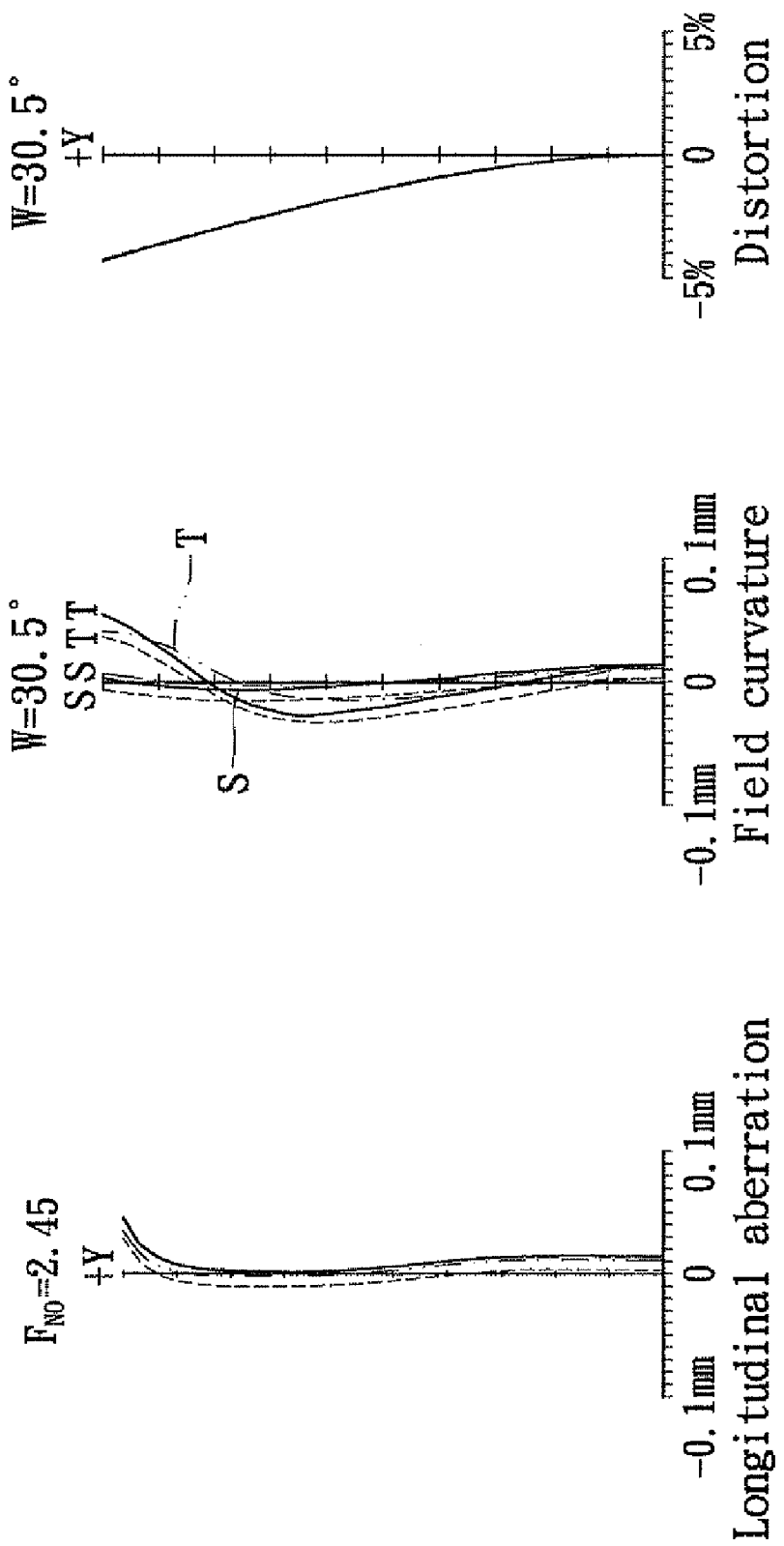
FIGS. 5D-5F are graphs showing longitudinal aberration (left), field curvature (middle) and distortion (right) of the zoom lens at wide-configuration, normal-configuration and tele-configuration according to the fifth embodiment of the present invention, respectively.
Figure 5E:
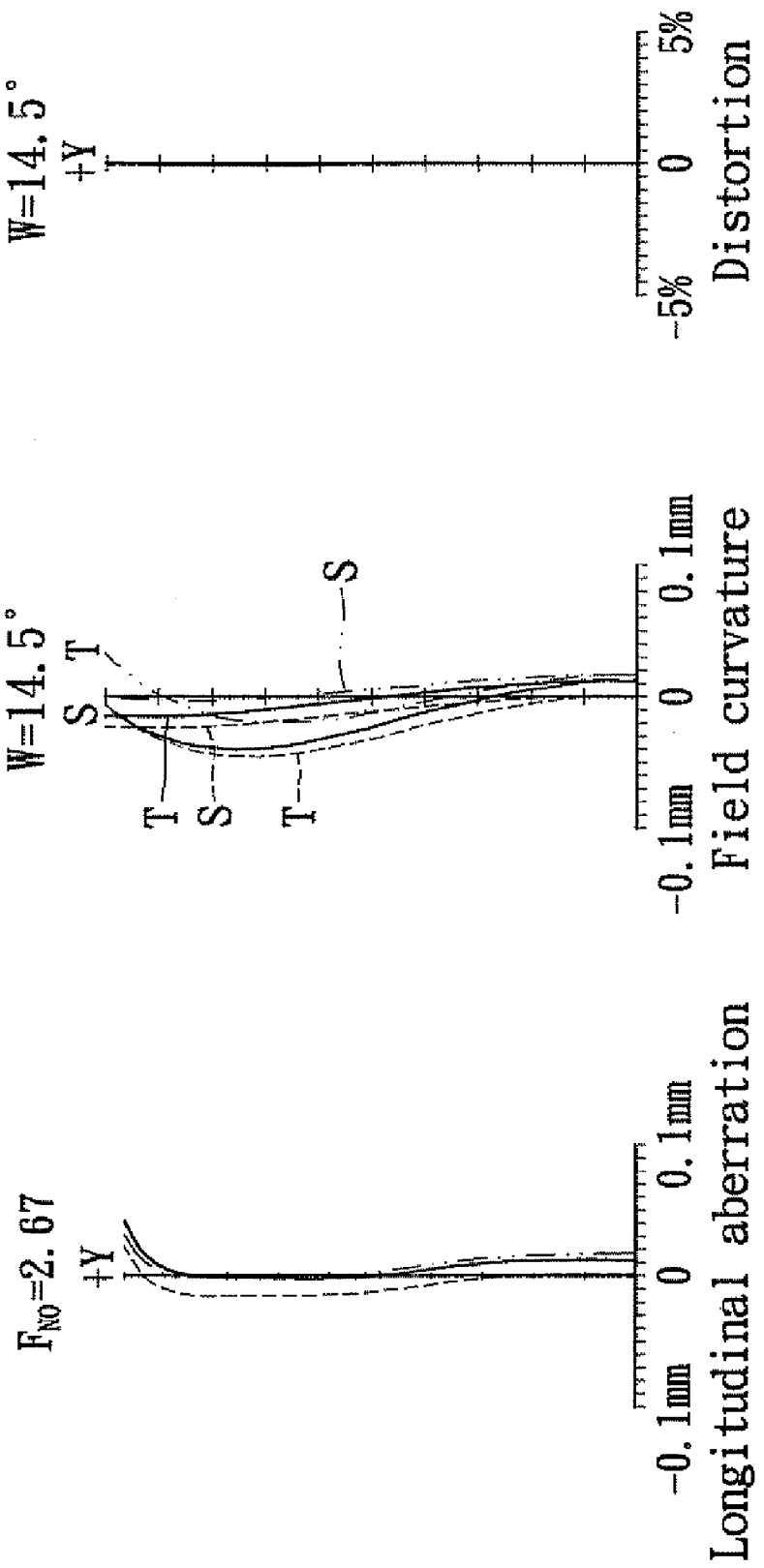
Figure 5F:
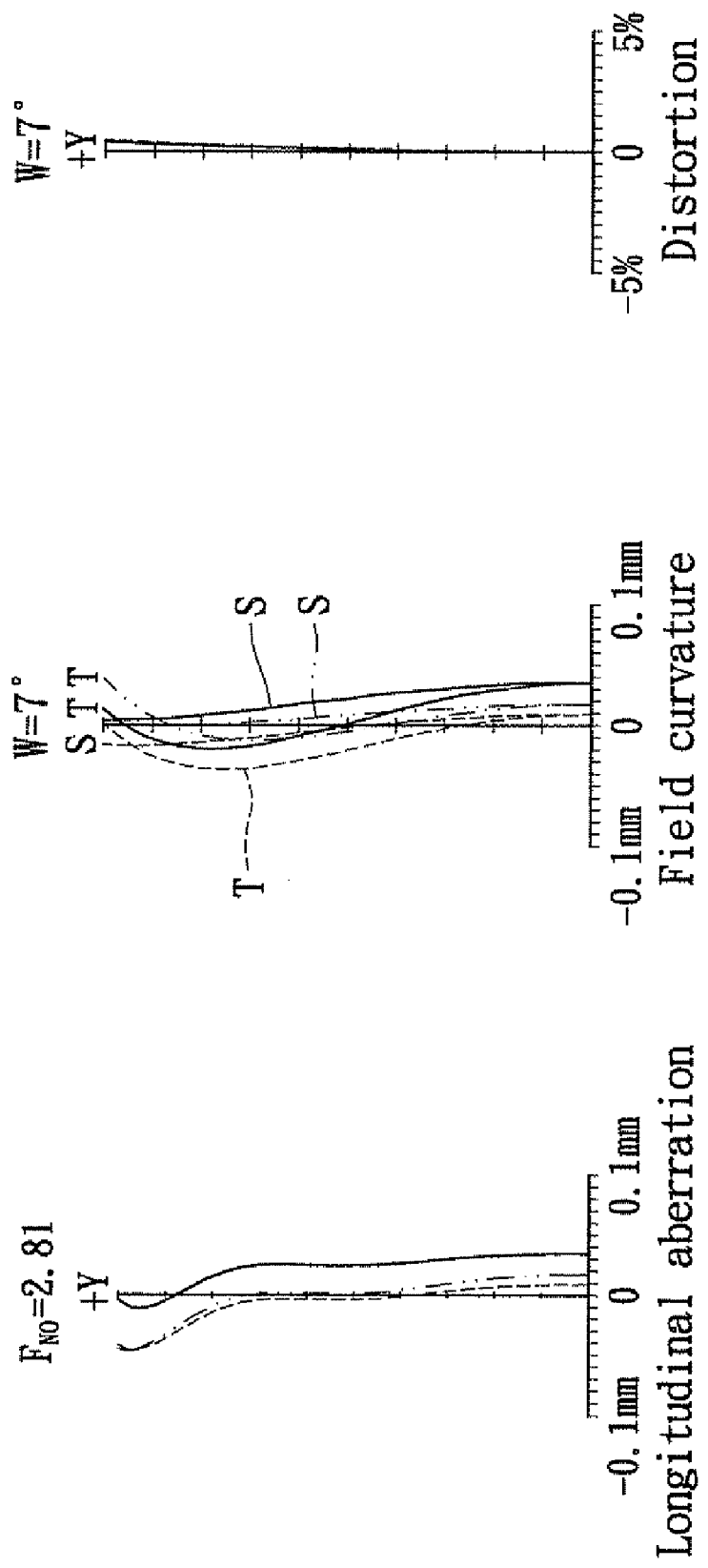

FIGS. 5A to 5C show schematic views of the lens groups arranged at wide-configuration (FIG. 5A), normal-configuration (FIG. 5B) and tele-configuration (FIG. 5C) according to the fifth embodiment of the present invention, respectively. Hence, the fifth embodiment is composed of ten pieces of lens that are the same as the first embodiment. FIG. 5D is a graph showing longitudinal aberration (left), field curvature (middle) and distortion (right) of the zoom lens at wide-configuration according to the fifth embodiment of the present invention, respectively. FIG. 5E is a graph showing longitudinal aberration (left), field curvature (middle) and distortion (right) of the zoom lens at normal-configuration according to the fifth embodiment of the present invention, respectively. FIG. 5F is a graph showing longitudinal aberration (left), field curvature (middle) and distortion (right) of the zoom lens at tele-configuration according to the fifth embodiment of the present invention, respectively.

The simulation data of the fifth embodiment of the present invention are shown as the following table.

| surface number | R (curvature radius) | D (distance) | $n_d$ (refractive index) | $V_d$ (Abbe value) |
|---|---|---|---|---|
| 1 | 24.831 | 1.067 | 1.85 | 23.8 |
| 2 | 15.853 | 2.389 | 1.62 | 63.3 |
| 3 | 94.759 | 0.07 | | |
| 4 | 15.448 | 1.943 | 1.64 | 60.1 |
| 5 | Infinity | variable | | |
| 6 | −174.229 | 0.707 | 1.70 | 55.5 |
| 7 | 3.677 | 1.74 | | |
| 8 | 8.978 | 1.315 | 1.52 | 56.3 |
| 9 | 4.13 | 0.674 | | |
| 10 | 20.698 | 1.351 | 1.61 | 26.6 |
| 11 | −15.000 | variable | | |
| 12 | Infinity | 0.345 | | |
| 13 | 6.742 | 0.807 | 1.52 | 56.3 |
| 14 | 16.726 | variable | | |
| 15 | 10.437 | 1.043 | 1.92 | 18.9 |
| 16 | 5.594 | 0.071 | | |

-continued

| surface number | R (curvature radius) | D (distance) | $n_d$ (refractive index) | $V_d$ (Abbe value) |
|---|---|---|---|---|
| 17 | 4.739 | 2.15 | 1.52 | 56.3 |
| 18 | −23.915 | 0.354 | | |
| 19 | 8.553 | 1.558 | 1.52 | 56.3 |
| 20 | 12.761 | variable | | |

The relationships of the variance D5, D11, D14 and D20 relative to different zoom position are shown as the following table:

| | Wide | Normal | Tele |
|---|---|---|---|
| f | 4.68 | 10.63 | 22.47 |
| $F_{NO}$ | 2.45 | 2.67 | 2.81 |
| 2ω | 61 | 29 | 14 |
| d5 | 1.209 | 7.39 | 11.772 |
| d11 | 11.348 | 5.161 | 0.779 |
| d14 | 3.878 | 2.215 | 1.404 |
| d20 | 8.108 | 9.772 | 10.583 |

Moreover, the optical surface S8, S11, S13, S14 and S17-S20 are aspherical surfaces, and the data of the aspherical surfaces are shown as the following table:

| Surface | K | $A_4$ | $A_6$ | $A_8$ | $A_{10}$ | $A_{12}$ |
|---|---|---|---|---|---|---|
| S8  | 0 | −3.81E−03 | 2.31E−06 | 2.64E−05 | −2.16E−07 | 6.89E−09 |
| S9  | 0 | −6.85E−04 | −3.90E−04 | 6.89E−05 | −4.66E−06 | 7.74E−08 |
| S10 | 0 | 1.53E−04 | −3.97E−04 | 2.61E−05 | −4.90E−07 | −2.36E−10 |
| S11 | 0 | −7.77E−04 | −1.06E−04 | 5.46E−06 | −3.42E−07 | 1.16E−09 |
| S13 | 0 | 1.39E−03 | −1.27E−06 | 2.08E−05 | −3.36E−06 | 3.87E−07 |
| S14 | 0 | 2.05E−03 | 8.33E−05 | 3.41E−05 | −5.22E−06 | 5.13E−07 |
| S17 | 0 | −1.63E−03 | −1.39E−04 | −5.55E−06 | 4.60E−07 | −6.76E−08 |
| S18 | 0 | −8.22E−05 | −1.00E−04 | 1.29E−06 | 1.57E−06 | −6.44E−08 |
| S19 | 0 | 5.17E−03 | −3.97E−05 | 1.67E−06 | −5.78E−07 | 1.18E−07 |
| S20 | 0 | 6.29E−03 | −1.24E−04 | 3.22E−05 | −5.82E−06 | 5.78E−07 |

In the fifth embodiment, the aperture value of the zoom lens is adjustable according to different image-capturing applications. For example, when using large aperture value to capture dynamic image, Fno needs to be small; when using high resolution to capture static image, Fno needs to be large.

The data from the first embodiment to the fourth embodiment are shown as the following table.

| | 1st embodiment | 2nd embodiment | 3rd embodiment | 4th embodiment |
|---|---|---|---|---|
| $F_W$ | 6.6 | 6.6 | 6.6 | 4.68 |
| $F_M$ | 15 | 15 | 15 | 10.63 |
| $F_T$ | 31.8 | 31.8 | 31.8 | 22.47 |
| F1 | 35.54 | 36.98 | 35.92 | 25.14 |
| F2 | −8.06 | −7.92 | −8.01 | −5.70 |
| F3 | 29.48 | 27.86 | 28.73 | 20.85 |
| F4 | 17.76 | 17.51 | 17.9 | 12.58 |
| F1/F3 | 1.21 | 1.33 | 1.25 | 1.21 |
| F1/F2 | −4.41 | −4.67 | −4.48 | −4.41 |
| $F4/F_W$ | 2.69 | 2.65 | 2.71 | 2.69 |
| $F4/F_M$ | 1.18 | 1.17 | 1.19 | 1.18 |
| $F4/F_T$ | 0.56 | 0.55 | 0.56 | 0.56 |
| $F4/[(F_W)(F_T)]^{1/2}$ | 1.23 | 1.21 | 1.24 | 1.23 |
| $f_{12}/f_3$ | 1.98 | 2.04 | 2.19 | 1.98 |
| $f_{56}/f_4$ | 3.11 | 3.12 | 3.12 | 3.11 | wherein. F1 is the focal length of the first lens group, F2 is the focal length of the second lens group, F3 is the focal length of the third lens group, F4 is the focal length of the fourth lens group, $F_W$ is the focal length at wide-configuration, $F_M$ is the focal length at normal-configuration, $F_T$ is the focal length at tele-configuration, $fl_{12}$ is the focal length of the combination of the first lens and the second lens in the first lens group, $fl_3$ is the focal length of the third lens in the first lens group, $fl_4$ is the focal length of the fourth lens in the second lens group, and $fl_{56}$ is the focal length of the combination of the fifth lens and the sixth lens in the second lens group.

In conclusion, the present invention has the following advantages:

1. The present invention has small variation of aperture value (the ratio of wide-configuration to tele-configuration is $(3.39/2.84)^2=1.42$) and moderate zoom ratio (5× zoom ratio), and has the advantage of compact size at the same time in order to decrease the whole volume of image capturing device.

2. The aperture value of the zoom lens of the present invention is adjustable according to different image-capturing applications. For example, when using large aperture value to capture dynamic image, Fno needs to be small; when using high resolution to capture static image, Fno needs to be large.

3. The present invention has at least four pieces of lens that are made of plastic material in order to achieve the purposes of decreasing camera lens weight and moving easily the lens groups.

The above-mentioned descriptions merely represent solely the preferred embodiments of the present invention, without any intention or ability to limit the scope of the present inven-

What is claimed is:

1. A zoom lens, comprising:
   a first lens group with positive refractive power fixed at a predetermined position;
   a second lens group with negative refractive power being movable along an optical axis of the zoom lens in accordance with the change of the magnification of the zoom lens;
   a third lens group with positive refractive power having at least one lens that is fixed at a predetermined position; and
   a fourth lens group with positive refractive power being movable along the optical axis in order to keep an image plane generated by the zoom lens to be projected accurately onto an image sensor;
   wherein the first, the second, the third and the fourth lens groups are arranged along the optical axis and from an object side of the zoom lens to an image side of the zoom lens in sequence, and the first, the second, the third and the fourth lens groups conform to the following conditions:

$4.4 < F1/|F2| < 4.7;$ condition (1)

$1.2 < F1/F3 < 1.4;$ and condition (2)

$1.1 < F4/(F_W F_T)^{1/2} < 1.4;$ condition (3)

wherein F1 is the focal length of the first lens group, F2 is the focal length of the second lens group, F3 is the focal length of the third lens group, F4 is the focal length of the fourth lens group, FW is the focal length at wide-configuration, and FT is the focal length at tele-configuration.

2. The zoom lens according to claim 1, further comprising an aperture, wherein the diameter of the aperture is changeable, and the aperture is arranged along the optical axis and between the second lens group and the third lens group.

3. A zoom lens, comprising:
   a first lens group with positive refractive power fixed at a predetermined position;
   a second lens group with negative refractive power being movable along an optical axis of the zoom lens in accordance with the change of the magnification of the zoom lens;
   a third lens group with positive refractive power having at least one lens that is fixed at a predetermined position; and
   a fourth lens group with positive refractive power being movable along the optical axis in order to keep an image plane generated by the zoom lens to be projected accurately onto an image sensor;
   wherein the first, the second, the third and the fourth lens groups are arranged along the optical axis and from an object side of the zoom lens to an image side of the zoom lens in sequence, the first lens group has a first lens, a second lens and a third lens that are arranged along the optical axis in sequence, the second lens group has a fourth lens, a fifth lens and a sixth lens that are arranged along the optical axis in sequence, and the first and the second lens groups conform to the following conditions:

$1.9 < fl_{12}/fl_3 < 2.2;$ and condition (1)

$3 < fl_{56}/fl_4 < 4;$ condition (2)

wherein $fl_{12}$ is the focal length of the combination of the first lens and the second lens in the first lens group, $fl_3$ is the focal length of the third lens in the first lens group, $fl_4$ is the focal length of the fourth lens in the second lens group, and $fl_{56}$ is the focal length of the combination of the fifth lens and the sixth lens in the second lens group.

4. The zoom lens according to claim 3, further comprising an aperture, wherein the diameter of the aperture is changeable, and the aperture is arranged along the optical axis and between the second lens group and the third lens group.

5. A zoom lens, comprising:
   a first lens group with positive refractive power fixed at a predetermined position;
   a second lens group with negative refractive power being movable along an optical axis of the zoom lens in accordance with the change of the magnification of the zoom lens;
   a third lens group with positive refractive power having at least one lens that is fixed at a predetermined position; and
   a fourth lens group with positive refractive power being movable along the optical axis in order to keep an image plane generated by the zoom lens to be projected accurately onto an image sensor;
   wherein the first, the second, the third and the fourth lens groups are arranged along the optical axis and from an object side of the zoom lens to an image side of the zoom lens in sequence, and the fourth lens group conforms to the following conditions:

$2.2 < F_4/F_W < 2.7;$ and condition (1)

$0.5 < F_4/F_T < 0.7;$ condition (2)

wherein F4 is the focal length of the fourth lens group, $F_W$ is the focal length at wide-configuration, and $F_T$ is the focal length at tele-configuration.

6. The zoom lens according to claim 5, further comprising an aperture, wherein the diameter of the aperture is changeable, and the aperture is arranged along the optical axis and between the second lens group and the third lens group.

* * * * *